United States Patent
Odinokikh et al.

(10) Patent No.: US 12,158,932 B2
(45) Date of Patent: Dec. 3, 2024

(54) BIOMETRICS-BASED USER AUTHENTICATION METHOD AND DEVICE

(71) Applicant: Samsung Electronics Co., Ltd., Suwon-si (KR)

(72) Inventors: Gleb Andreevich Odinokikh, Moscow (RU); Ivan Andreevich Solomatin, Mytischi District (RU); Aleksei Mikhailovich Fartukov, Moscow (RU); Iurii Sergeevich Efimov, Dolgoprudny (RU); Vitaly Sergeevich Gnatyuk, Moscow (RU); Vladimir Alekseevich Eremeev, Moscow (RU); Juwoan Yoo, Suwon-si (KR); Kwanghyun Lee, Suwon-si (KR); Heejun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 546 days.

(21) Appl. No.: 17/288,256

(22) PCT Filed: Aug. 23, 2019

(86) PCT No.: PCT/KR2019/010781
§ 371 (c)(1),
(2) Date: Apr. 23, 2021

(87) PCT Pub. No.: WO2020/085632
PCT Pub. Date: Apr. 30, 2020

(65) Prior Publication Data
US 2021/0382970 A1 Dec. 9, 2021

(30) Foreign Application Priority Data

Oct. 26, 2018 (RU) .......................... RU2018137909
Jul. 8, 2019 (KR) ........................ 10-2019-0082227

(51) Int. Cl.
*G06F 21/32* (2013.01)
*G06F 21/45* (2013.01)
(Continued)

(52) U.S. Cl.
CPC .............. *G06F 21/32* (2013.01); *G06F 21/45* (2013.01); *G06N 3/045* (2023.01)

(58) Field of Classification Search
CPC .......... G06F 21/32; G06F 21/45; G06F 16/50; G06F 7/00; G06N 3/045; G06N 3/047;
(Continued)

(56) References Cited

U.S. PATENT DOCUMENTS 6,151,424 A 11/2000 Hsu
7,360,087 B2 4/2008 Jorgensen et al.
(Continued)

FOREIGN PATENT DOCUMENTS

CN 105632501 A 6/2016
CN 106934553 A 7/2017
(Continued)

OTHER PUBLICATIONS

On the Learning of Deep Local Features for Robust Face Spoofing Detection, Souza et al, Oct. 2018 (Year: 2018).*
(Continued)

*Primary Examiner* — Jahangir Kabir
(74) *Attorney, Agent, or Firm* — Jefferson IP Law, LLP

(57) ABSTRACT

According to an embodiment of the disclosure, there is provided a biometrics-based user authentication method including: obtaining a user's biometric image, obtaining a shallow biometric feature from the user's biometric image by using a first neutral network of a learning network model, obtaining a deep biometric feature from the user's biometric image by using a second neutral network of the learning network model, determining a similarity between the shal-
(Continued)

low and deep biometric features and a valid user's biometric features stored in advance, and determining whether the user matches the valid user, based on the determined similarity.

16 Claims, 18 Drawing Sheets

(51) Int. Cl.
 *G06N 3/04* (2023.01)
 *G06N 3/045* (2023.01)
(58) Field of Classification Search
 CPC . G06N 3/08; G06N 20/00; G06N 3/02; G06T 7/0014
 USPC .......................................................... 713/18
 See application file for complete search history.

(56) References Cited

U.S. PATENT DOCUMENTS

| | | | |
|---|---|---|---|
| 9,195,890 B2 | 11/2015 | Bergen | |
| 9,430,629 B1 | 8/2016 | Ziraknejad et al. | |
| 9,730,643 B2 | 8/2017 | Georgescu et al. | |
| 9,940,509 B2 | 4/2018 | Yu et al. | |
| 10,331,941 B2 | 6/2019 | Rhee et al. | |
| 10,387,714 B2 | 8/2019 | Han et al. | |
| 11,500,937 B1 * | 11/2022 | Zappella | G06F 16/90328 |
| 2015/0379253 A1 | 12/2015 | Cook et al. | |
| 2016/0217277 A1 * | 7/2016 | Johnston | G06V 40/70 |
| 2017/0116401 A1 | 4/2017 | Kim et al. | |
| 2017/0161638 A1 | 6/2017 | Garagic et al. | |
| 2017/0249536 A1 | 8/2017 | Hillar et al. | |
| 2017/0262695 A1 | 9/2017 | Ahmed | |
| 2017/0316311 A1 | 11/2017 | Pilly et al. | |
| 2017/0372155 A1 | 12/2017 | Odry et al. | |
| 2018/0012071 A1 | 1/2018 | Korobkin et al. | |
| 2018/0018516 A1 | 1/2018 | Odinokikh et al. | |
| 2018/0068103 A1 | 3/2018 | Pitkanen et al. | |
| 2018/0108137 A1 | 4/2018 | Price et al. | |
| 2018/0137343 A1 | 5/2018 | Liu et al. | |
| 2018/0137941 A1 | 5/2018 | Chen | |
| 2018/0144209 A1 | 5/2018 | Kim et al. | |
| 2018/0189466 A1 | 7/2018 | Raviv et al. | |
| 2018/0260553 A1 | 9/2018 | Hoyos et al. | |
| 2018/0285629 A1 | 10/2018 | Son et al. | |
| 2018/0299953 A1 * | 10/2018 | Selker | G06F 3/013 |
| 2019/0171868 A1 | 6/2019 | Taigman et al. | |
| 2019/0280869 A1 * | 9/2019 | Streit | H04L 9/3231 |
| 2020/0064631 A1 * | 2/2020 | Robbins | G06F 3/013 |
| 2020/0285837 A1 | 9/2020 | Rhee et al. | |

FOREIGN PATENT DOCUMENTS

| | | |
|---|---|---|
| CN | 106960243 A | 7/2017 |
| CN | 107301383 A | 10/2017 |
| JP | 2017-010543 A | 1/2017 |
| JP | 2018-165983 A | 10/2018 |
| KR | 10-2016-0083900 A | 7/2016 |
| KR | 10-2017-0000748 A | 1/2017 |
| KR | 10-2017-0046436 A | 5/2017 |
| KR | 10-2018-0109634 A | 10/2018 |
| RU | 2308080 C2 | 10/2007 |
| RU | 2610696 C2 | 2/2017 |

OTHER PUBLICATIONS

International Search Report dated Dec. 4, 2019, issued in International Patent Application No. PCT/ KR2019/010781.
Russian Decision on Grant dated Jun. 26, 2019, issued in Russian Patent Application No. 2018137909.
Russian Search Report dated Jun. 26, 2019, issued in Russian Patent Application No. 2018137909.
Korean Office Action dated May 12, 2024, issued in Korean Application No. 10-2019-0082227.

* cited by examiner

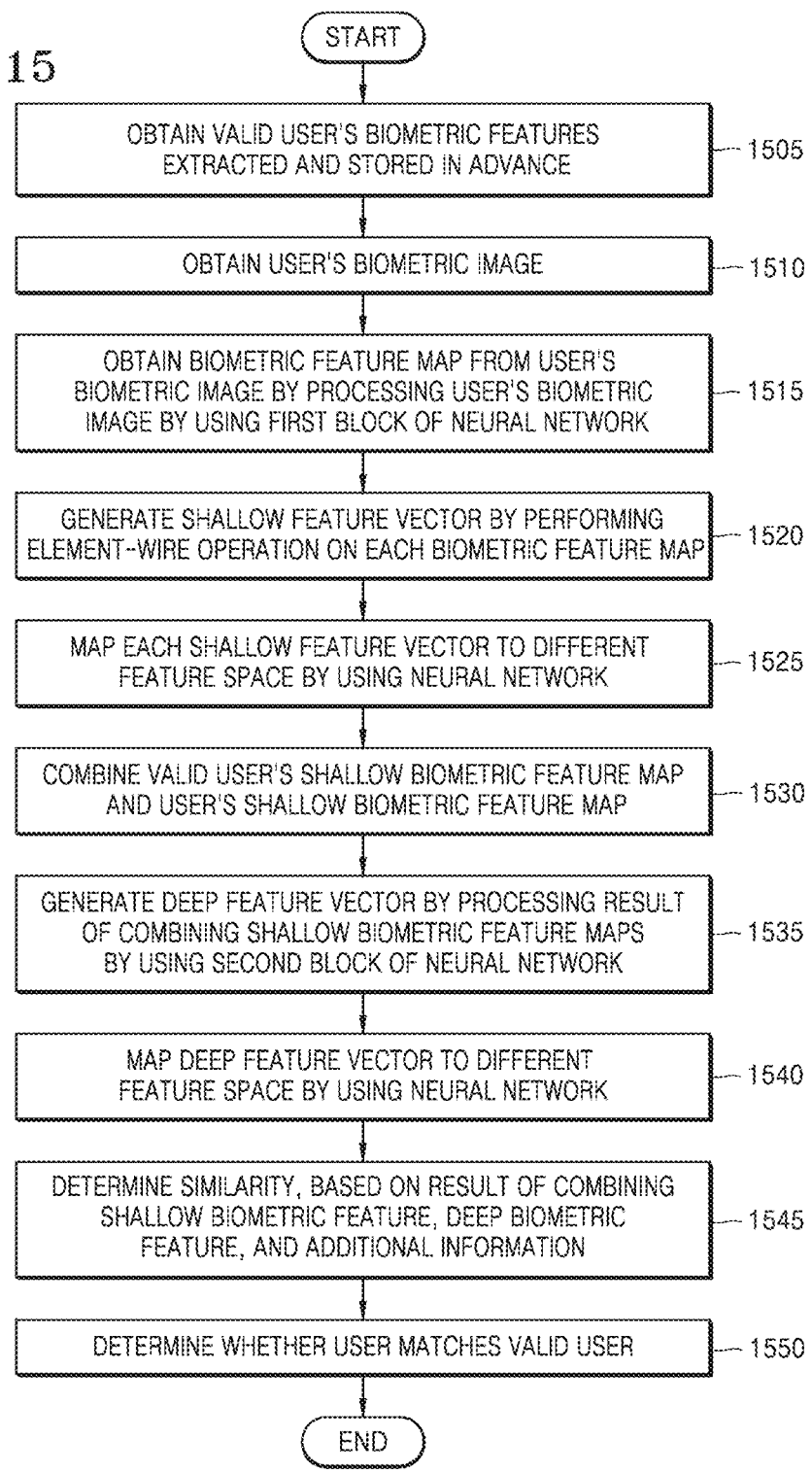

BIOMETRICS-BASED USER AUTHENTICATION METHOD AND DEVICE

TECHNICAL FIELD

Embodiments of the disclosure relate to a biometrics-based user authentication method and device, and more particularly, to a biometrics-based user authentication method and device using a learning network model.

BACKGROUND ART

Recently, with the development of high-performance cameras and sensors, technology for performing user authentication using a user's biometric information (e.g., fingerprints, an iris, voice, a face, etc.) obtained by a biometric sensor has been developed to enhance security. User authentication functions are mainly used in financial devices, access control devices, mobile devices, notebook computers, and the like, and recently, as mobile devices such as smartphones have come into widespread use, sensors for personal authentication are provided to protect a large amount of information stored in smartphones.

However, biometrics-based user authentication methods have limitations due to high sensitivity to various situations, movement of a living body, a user's other features, etc. For example, in the case of iris recognition, biometrics-based user authentication may be considerably influenced by dim lighting, excessive lighting, when a user is wearing glasses or contact lenses, blinking of the eyes, or when an iris is hidden by an eyelid or eyelashes. In this case, an error rate in biometrics-based user authentication may increase, recognition performance may decrease, and accessibility convenience may decrease.

DESCRIPTION OF EMBODIMENTS

Technical Problem

In order to address the above-described problem, the disclosure is directed to providing a biometrics-based user authentication method and device using a training network model to increase the accuracy of user authentication.

The disclosure is directed to providing a computer program product including a non-transitory computer-readable recording medium storing a program for performing the method in a computer. Technical aspects are not limited thereto and additional technical aspects may be derivable.

Solution to Problem

According to an embodiment of the disclosure, a biometrics-based user authentication method includes obtaining a user's biometric image; obtaining a shallow biometric feature from the obtained user's biometric image by using a first neural network of a learning network model; obtaining a deep biometric feature from the obtained user's biometric image by using a second neural network of the learning network model; determining a similarity between the shallow and deep biometric features and a valid user's biometric features stored in advance; and determining whether the user matches the valid user, based on the determined similarity.

In an embodiment of the disclosure, the obtaining of the deep biometric feature may include obtaining the deep biometric feature from the shallow biometric feature by using the second neural network.

In an embodiment of the disclosure, the biometrics-based user authentication method may further include generating a first feature vector by combining the valid user's shallow biometric feature with the user's shallow biometric feature; generating a second feature vector by combining the valid user's deep biometric feature with the user's deep biometric feature; and determining the similarity, based on the difference between the first and second feature vectors.

In an embodiment of the disclosure, the determining of the similarity may include normalizing the user's shallow and deep biometric features, and determining the similarity by using the normalized shallow and deep biometric features.

In an embodiment of the disclosure, the biometrics-based user authentication method may further include receiving additional information including at least one of situation information or the user's state information when the user's biometric image is obtained, and the determining of the similarity may include determining the similarity, based on the additional information.

In an embodiment of the disclosure, the learning network model may include a Convolutional Neural Network (CNN) model learned in advance using a variational inference.

In an embodiment of the disclosure, the second neural network may include a neural network with five or less convolutional neural network layers.

In an embodiment of the disclosure, the obtaining of the user's biometric image may include capturing the user's biometric image using a camera, and the biometrics-based user authentication method may further include displaying the user's biometric image such that the user's body is partially or entirely hidden.

In an embodiment of the disclosure, the biometrics-based user authentication method may further include obtaining the valid user's biometric image; obtaining the valid user's shallow biometric feature and deep biometric feature from the valid user's biometric image by using the learning network model; and storing the valid user's shallow and deep biometric features.

In an embodiment of the disclosure, the biometrics-based user authentication method may further include normalizing the valid user's shallow and deep biometric features, and the storing of the valid user's shallow and deep biometric features may include storing the normalized valid user's shallow and deep biometric features.

According to an embodiment of the disclosure, a biometrics-based user authentication device includes a memory storing one or more instructions; and at least one processor configured to execute the one or more instructions stored in the memory, wherein the at least one processor is configured to execute the one or more instructions to: obtain a user's biometric image; obtain a shallow biometric feature from the obtained user's biometric image by using a first neural network of a learning network model; obtain a deep biometric feature from the obtained user's biometric image by using a second neural network of the learning network model; determine a similarity between the shallow and deep biometric features and a valid user's biometric features stored in advance; and determine whether the user matches the valid user, based on the similarity.

An embodiment of the disclosure includes a program stored in a recording medium to cause a computer to execute a method according to an embodiment of the disclosure.

An embodiment of the disclosure includes a non-transitory computer-readable recording medium having recorded thereon a program for causing a computer to execute a method according to an embodiment of the disclosure.

An embodiment of the disclosure includes a non-transitory computer-readable recording medium having recorded thereon a database used in an embodiment of the disclosure.

ADVANTAGEOUS EFFECTS OF DISCLOSURE

According to embodiments of the disclosure, a biometrics-based user authentication method and device are provided to increase the accuracy of biometric recognition and allow easy user authentication.

According to embodiments of the disclosure, the performance of a biometrics-based user authentication service in a mobile computing device having a limited computing resource can be improved.

Other features and advantages of the disclosure will become apparent from the following detailed description and the accompanying drawings.

BRIEF DESCRIPTION OF THE DRAWINGS

FIG. 15 is a flowchart of a biometrics-based user authentication method using additional information, according to an embodiment of the disclosure.

MODE OF DISCLOSURE

Figure 1:
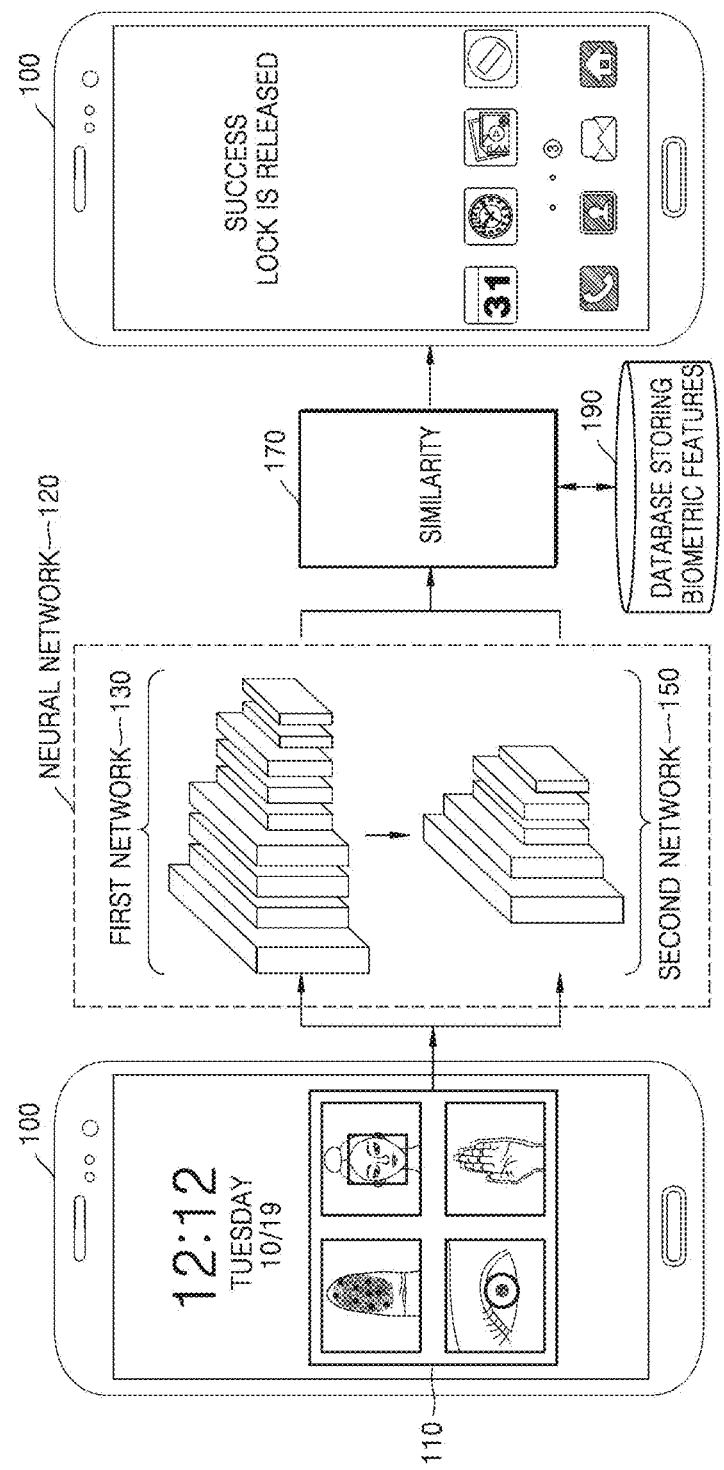
FIG. 1 is a diagram illustrating an overview of a biometrics-based user authentication method according to an embodiment of the disclosure.

Hereinafter, embodiments of the disclosure will be described in detail with reference to the accompanying drawings so that the embodiments may be easily implemented by those of ordinary skill in the art. However, the disclosure may be embodied in many different forms and is not limited to the embodiments set forth herein. The embodiments described herein are only examples and thus the scope of the disclosure is not limited thereby in any way. For brevity of the specification, a description of existing electronic configurations, control systems, software, and other functional aspects of the systems may be omitted.

The terms used herein will be briefly described and thereafter the disclosure will be described in detail.

In the disclosure, general terms that have been widely used nowadays are selected considering functions of the disclosure but various other terms may be selected according to the intentions of technicians in the art, precedents, or new technologies, etc. Accordingly, the terms used herein should be defined not based on the names thereof but based on the meanings thereof and the whole context of the disclosure. Terms such as first and second may be used to describe various components but the components should not be limited by the terms. These terms are only used to distinguish one component from another. Expressions such as "an embodiment" appearing in various parts of the disclosure are not intended to refer to the same embodiment. In the disclosure, " . . . includes at least one of a, b, or c" should be understood to mean that only a is included, only b is included, only c is included, a and b are included, b and c are included, a and c are included, or a, b, and c are included.

The term "unit" used herein should be understood as software or a hardware component, such as a field programmable gate array (FPGA) or an application specific integrated circuit (ASIC), which performs certain functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, features, procedures, subroutines, segments of program code, drivers, firmware, microcode, a circuit, data, a database, data structures, tables, arrays, and parameters. Components and functions provided in "units" may be combined to a smaller number of components and "units" or may be divided into sub-components and "sub-units".

An embodiment of the disclosure may be represented by functional block configurations and various operations. Some or all of the functional blocks may be implemented by various numbers of hardware and/or software configurations for performing certain functions. For example, the functional blocks of the disclosure may be implemented by one or more microprocessors or by circuit configurations for a certain function. For example, the functional blocks of the disclosure may be implemented in various programming or scripting languages. The functional blocks may be implemented in an algorithm executed by one or more processors. In the disclosure, the prior art may be employed for electronic configuration, signal processing, and/or data processing.

In the following description of the disclosure, related well-known functions or components are not described in detail when it is determined that they would obscure the subject matter of the disclosure due to unnecessary detail. For convenience of description, a device and a method will be described herein together, when necessary.

Functions associated with artificial intelligence according to the disclosure are performed by a processor and a memory. The processor may include one or more processors. In this case, the one or more processors may include a general-use processor such as a central processing unit (CPU), an application processor (AP) or a digital signal processor (DSP), a graphics-dedicated processor such as a graphics processing unit (GPU) or a vision processing unit (VPU), or an artificial-intelligent-dedicated processor such as a neural processing unit (NPU). The one or more processors control input data to be processed according to a predefined operation rule stored in memory or an artificial intelligence model. Alternatively, when the one or more processors are artificial-intelligent-dedicated processors, the artificial-intelligent-dedicated processors may be designed as hardware structures specialized in processing of a certain artificial intelligence model.

The predefined operation rule or the artificial intelligence model may be made by learning. Here, the making of the predefined operation rule or the artificial intelligence model by learning should be understood to mean that a basic artificial intelligence model is learned using multiple pieces of training data by a learning algorithm, thereby creating the predefined operation rule or the artificial intelligence model to perform a desired feature (or purpose). The above-described learning may be made by a device in which artificial intelligence according to the disclosure is performed or by a separate server and/or a system. Examples of the learning algorithm may include supervised learning, unsupervised learning, semi-supervised learning, or reinforcement learning but are not limited thereto.

The artificial intelligence model may include a plurality of neural network layers. A plurality of weights may be allocated to the plurality of neural network layers, and a neural network operation may be performed through a result of performing an operation on a previous layer and the plurality of weights. The plurality of weights of the plurality of neural network layers may be optimized by a result of training the artificial intelligence model. For example, the plurality of weights may be updated to reduce or minimize a loss value or a cost value obtained from the artificial intelligence model during a learning process. The artificial neural network may include, but is not limited to, a deep neural network (DNN), e.g., a convolutional neural network (CNN), a DNN, a recurrent neural network (RNN), a restricted Boltzmann machine (RBM), a deep belief network (DBN), a bidirectional recurrent DNN (BRDNN), or deep Q-networks.

The CNN may include a convolution layer, a pooling layer, and an activation map. The pooling layer may be used to receive output data of the CNN as an input, and reduce a size of an activation map that is output data or emphasize certain data.

Hereinafter, embodiments of the disclosure will be described in detail with reference to the accompanying drawings so that the embodiments of the disclosure may be easily implemented by those of ordinary skill in the art. However, the disclosure may be embodied in many different forms and is not limited to the embodiments of the disclosure set forth herein. For clarity, parts that are not related to describing the disclosure are omitted in the drawings, and like components are denoted by like reference numerals throughout the specification.

Hereinafter, the disclosure will be described in detail with reference to the accompanying drawings.

In the following description, it is assumed for convenience of explanation that a biometrics-based user authentication process is a process of unlocking a lock screen. However, the biometrics-based user authentication technique is also applicable to a user authentication process for asset management, a payment system, and the like, as well as unlocking the lock screen.

FIG. 1 is a diagram illustrating an overview of a biometrics-based user authentication method according to an embodiment of the disclosure.

Referring to FIG. 1, in a biometrics-based user authentication process, a user may be authenticated using a neural network 120. In an embodiment of the disclosure, a device 100 may obtain a user's biometric image 110. In addition, the device 100 may process the user's biometric image 110 by using the neural network 120 to obtain the user's shallow biometric feature and deep biometric feature.

In an embodiment of the disclosure, biometric features may include features of a human physical shape such as a face, a face thermogram, a fingerprint, an iris, a retina, ears, hands, the lines of the palm, an eyelid shape, an eyelash shape, skin, veins, etc. or a human behavioral feature such as a voice, a gait, a signature, etc. A biometric feature may be a target of biometrics. Generally, the biometric feature refers to a human biometric features as described above but an animal's biometric feature may be used in an embodiment of the disclosure.

The shallow biometric feature and the deep biometric feature may be determined by a range of learned data, the number of times learning, the type of a neural network used for learning, and the type and number of layers of the neural network used for learning, but embodiments of the disclosure are not limited thereto. For example, the shallow biometric feature may be a biometric feature with a stride greater than 1 and thus representing an outline of the biometric image 110, and the deep biometric feature may be a biometric feature with a stride of 1 and thus representing a minute feature of the biometric image 110. For example, the shallow biometric feature may be a biometric feature representing texture of the biometric image 110, which is extracted by an initial shallow layer of the neural network 120. The deep biometric feature may be a biometric feature representing details of the biometric image 110, which are extracted by a deep layer of the neural network 120.

The neural network 120 may be a set of algorithms for performing user authentication. Alternatively, the neural network 120 may be embodied as software or an engine for executing the set of the algorithms described above. The neural network 120, when embodied as software or an engine, may be executed by a processor of a server or a processor included in the device 100. In an embodiment of the disclosure, the neural network 120 may include a plurality of layers consisting of a plurality of nodes. For example, the neural network 120 may include an input layer, a hidden layer, an output layer, and the like. In addition, the neural network 120 may include connection weights for connecting a plurality of nodes included in each of the plurality of layers to the nodes included in the other layers. According to an embodiment of the disclosure, the neural network 120 may include a first network 130 and a second network 150. The first network 130 may be used to extract the shallow biometric feature from the user's biometric image 110 and the second network 150 may be used to extract the deep biometric feature from the user's biometric image 110 but embodiments of the disclosure are not limited thereto. In an embodiment of the disclosure, the first network 130 and the second network 150 may be different neural networks. Accordingly, the device 100 may extract the shallow biometric feature from the user's biometric image 110 by using the first network 130 and extract the deep biometric feature from the user's biometric image 110 by using the second network 150. According to another embodiment of the disclosure, the second network 150 may be connected to the first network 130, and may be a set of separate layers constituting the network 20, together with the first network 130. That is, the first network 130 and the second network 150 may be included in a single neural network. Accordingly, the device 100 may extract the shallow biometric feature from the user's biometric image 110 by using the first network 130, and extract the deep biometric feature from the extracted shallow biometric feature by using the second network 150 connected the first network 130. That is, the device 100 may extract the shallow biometric feature and the deep biometric feature by combining multiple layers of a single neural network instead of using two different neural networks.

In an embodiment of the disclosure, the device 100 may calculate a similarity 170 with respect to a valid user's biometric features stored in a database 190, based on the user's shallow biometric feature and deep biometric feature. Based on the calculated similarity 170, the device 100 may determine whether the user matches the valid user and permit the user to access the device 100. The device 100 may perform a high-accuracy biometrics-based user authentication method according to an embodiment of the disclosure. The device 100 may improve the performance of a biometrics-based user authentication service in a mobile computing device having a limited computing resource.

The device 100 may be, but is not limited to, a smartphone, a tablet personal computer (PC), a smart TV, a cellular phone, a personal digital assistant (PDA), a laptop computer, a netbook, a media player, a micro-server, a global positioning system (GPS) device, an e-book terminal, a digital broadcasting terminal, a navigation device, a kiosk, an MP3 player, a digital camera, a home appliance, or another mobile or non-mobile computing device. Alternatively, the device 100 may be a wearable device such as a watch, eyeglasses, a hair band, or a ring having a communication function and a data processing function.

Figure 2:
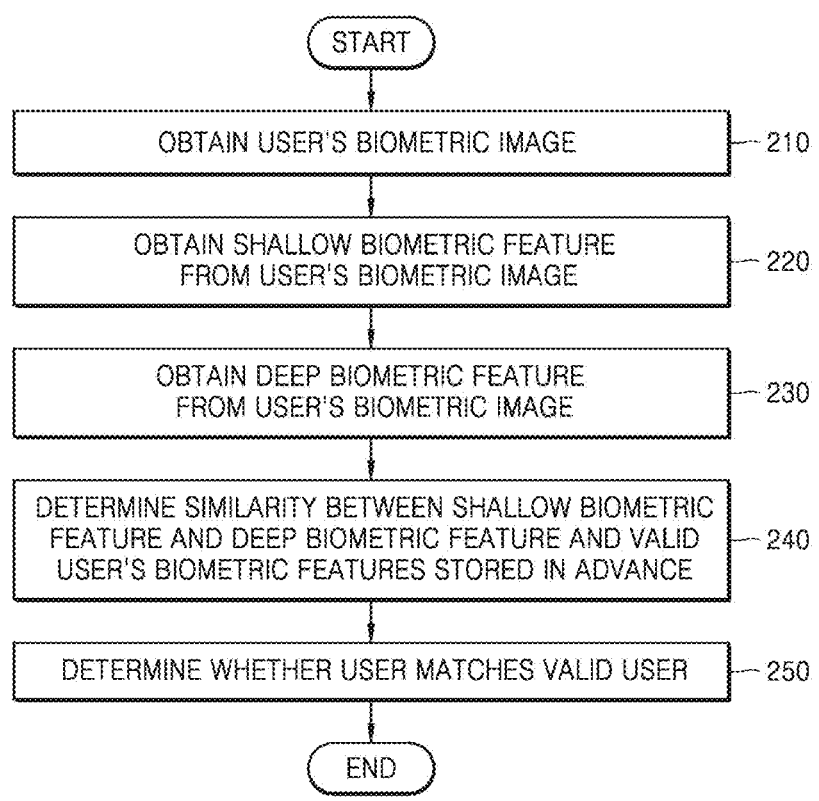
FIG. 2 is a flowchart schematically illustrating a biometrics-based user authentication method performed by a biometrics-based user authentication device according to an embodiment of the disclosure.

FIG. 2 is a flowchart schematically illustrating a biometrics-based user authentication method performed by a biometrics-based user authentication device according to an embodiment of the disclosure.

Referring to FIG. 2, in operation 210, the device 100 may obtain a user's biometric image. The device 100 may obtain the user's biometric image by using a camera, an image sensor, a depth sensor, or the like, but embodiments of the disclosure are not limited thereto.

In operation 220, the device 100 may obtain a shallow biometric feature from the user's biometric image 110. The device 100 may obtain the shallow biometric feature from the user's biometric image 110 by using a first neural network of a training network model.

In operation 230, the device 100 may obtain a deep biometric feature from the user's biometric image 110. The device 100 may obtain the deep biometric feature from the user's biometric image 110 by using a second neural network of the training network model. According to another embodiment of the disclosure, the device 100 may obtain the deep biometric feature from the user's shallow biometric feature by using a second neural network constituting a single neural network, together with the first neural network. That is, the shallow biometric feature, which is an output of an output layer of the first neural network, may be an input of an input layer of the second neural network. In an embodiment of the disclosure, the number of layers included in the second neural network may be different from the number of layers included in the first neural network. For example, the number of layers of the second neural network may be less than the number of layers of the first neural network. Alternatively, the number of layers, a degree of total conversion, and parameters of the second neural network may be the same as or different from those of the first neural network according to an allowable number of layers, an allowable degree of total conversion, and allowable parameters for the second neural network, and may be determined according to a desired data processing speed and a desired accuracy of recognition.

In an embodiment of the disclosure, the first neural network and the second neural network may operate on a local computing device. Accordingly, the device 100 is capable of enhancing the privacy of the user's biometric data. In another embodiment of the disclosure, the first neural network and the second neural network may be stored in a secure cloud, and may be used online by the device 100 through a server. Therefore, a part of or the entire load occurring when the device 100 extracts the shallow biometric feature and the deep biometric feature may be transferred to a server, thereby reducing a delay caused due to a use capacity of and overload on the device 100.

In operation 240, the device 100 may determine a similarity between the user's biometric features, including the shallow biometric feature and the deep biometric feature, and a valid user's biometric features stored in advance. The similarity is information indicating a similarity between a valid user's biometric feature and a current user's biometric feature, and may be determined by various techniques, e.g., a mean square error, the Euclidean distance, or Kullback-Leibler divergence. The device 100 may use the database 190 to use the valid user's biometric features stored in advance. Alternatively, the device 100 may use a neural network to determine the similarity between the valid user's biometric feature and the current user's biometric feature. For example, the device 100 may use one or more layers of a convolutional neural network to determine the similarity. However, a method of determining the similarity is not limited thereto.

In operation 250, the device 100 may determine whether the user matches the valid user, based on the determined similarity. In an embodiment of the disclosure, when the similarity is greater than a threshold, the device 100 may permit the user to access the device 100. In an embodiment of the disclosure, when the similarity is less than the threshold, the device 100 may not permit the user to access the device 100. In an embodiment of the disclosure, the threshold may be, but is not limited to, a predetermined value or an appropriate value determined according to a learning network model.

In an embodiment of the disclosure, the threshold for the comparison may be set after testing a test sample. A result of the testing may be used to configure a curved receiver operating characteristic (ROC) reflecting the relationship between a false non-match rate (FNMR) and a false match rate (FMR). In an embodiment of the disclosure, the threshold may be determined by a value maintained within a limit in which the FNMR and the FMR are permitted according to a predetermined accuracy requirement of recognition.

Figure 3:
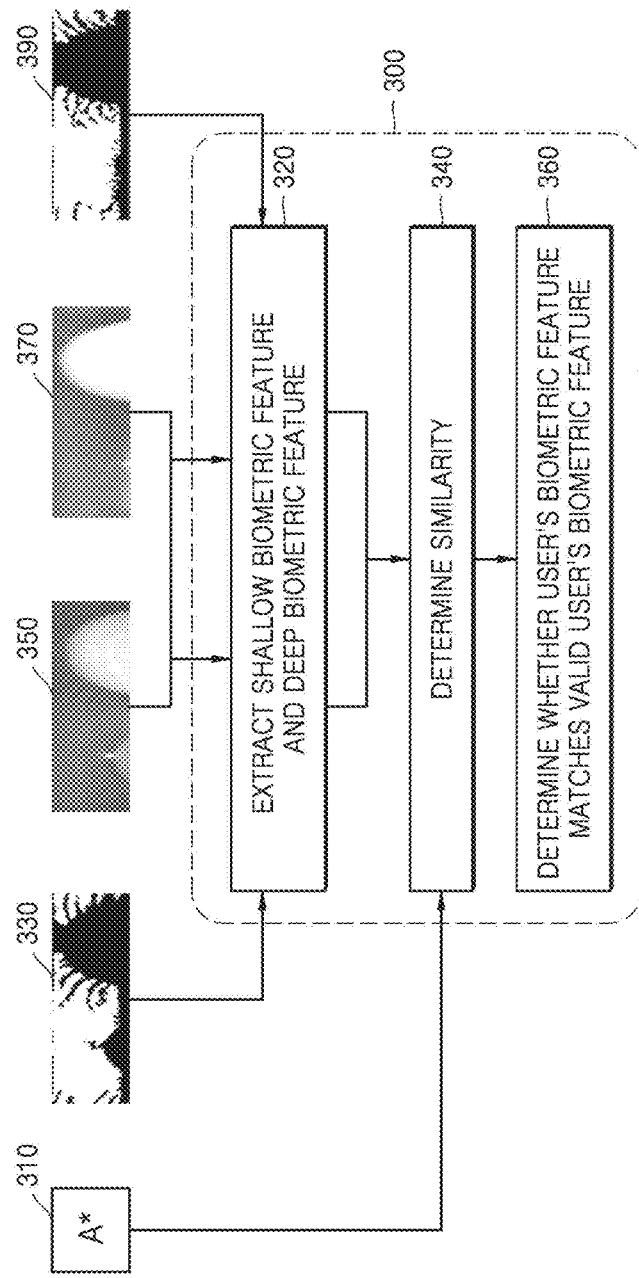
FIG. 3 is a diagram illustrating a method of performing a biometrics-based user authentication process by extracting a shallow biometric feature and a deep biometric feature from a biometric image, according to an embodiment of the disclosure.

FIG. 3 is a diagram illustrating a method of performing a biometrics-based user authentication process by extracting a shallow biometric feature and a deep biometric feature from a biometric image, according to an embodiment of the disclosure.

Referring to FIG. 3, a device may obtain a user's biometric image 350 and a valid user's biometric image 370. For example, in an iris-recognition-based user authentication system, the user's biometric image 350 may be an image of an iris with a dilated pupil, which is obtained in a dark environment, and the valid user's biometric image 370 may be an image of an iris with a contracted pupil, which is obtained in a bright environment. In addition, the device may obtain a first mask 330 and a second mask 390 that are results obtained by respectively normalizing the user's biometric image 350 and the valid user's biometric image 370 by using a learning network model.

In operation 320, the device may extract a shallow biometric feature and a deep biometric feature from the user's biometric image 350, the first mask 330, the valid user's biometric image 370, and the second mask 390 by using a neural network. According to an embodiment of the disclosure, a process of obtaining the first mask 330 and the second mask 390 may be omitted. Accordingly, the device may extract the user's shallow biometric feature and deep biometric feature from the user's biometric image 350 in a dark environment and the valid user's biometric image 370 in a bright environment.

In operation 340, the device may determine a similarity between the valid user's biometric feature and the user's biometric feature, based on the extracted shallow biometric feature and deep biometric feature. According to an embodiment of the disclosure, the device may use both the shallow biometric feature and the deep biometric feature to maintain a high authentication speed in a biometrics-based user authentication process 300 and increase the accuracy of the biometrics-based user authentication process 300. In an embodiment of the disclosure, the similarity may be determined using additional information 310, as well as the extracted shallow biometric feature and deep biometric feature. For example, the device may determine the similarity by using information regarding the user's biometric image 350 obtained in the dark environment and information regarding the valid user's biometric image 370 obtained in a bright environment. In an embodiment of the disclosure, the additional information 310 may include, but is not limited to, situation information, including the weather and time when the user's biometric image 350 was obtained, a degree of lighting, etc., and the user's state information, including whether the user was wearing glasses or lenses, a degree of pupil dilatation or contraction, biometric feature information excluding biometric features of a part of a living body to be obtained, etc. The additional information 310 may be numerical representation information indicating degrees of distortion of values of pixels of the biometric image 350, where the distortion is generated based on the situation information and the user's state information when the biometric image 350 was obtained. For example, the additional information 310 may be represented by a vector and used by the device to determine a similarity, together with the shallow biometric feature and the deep biometric feature. In an embodiment of the disclosure, the device may perform a biometrics-based user authentication process with a more accurate recognition rate by taking into additional consideration the additional information 310.

In operation 360, the device may determine whether the user's biometric feature matches the valid user's biometric feature, based on the determined similarity. In an embodiment of the disclosure, when the similarity is greater than a threshold, the device may permit the user to access the device. In another embodiment of the disclosure, when the similarity is less than the threshold, the device may not permit the user to access the device. In an embodiment of the disclosure, the threshold may be, but is not limited to, a predetermined value or an appropriate value determined according to a learning network model.

Figure 4:
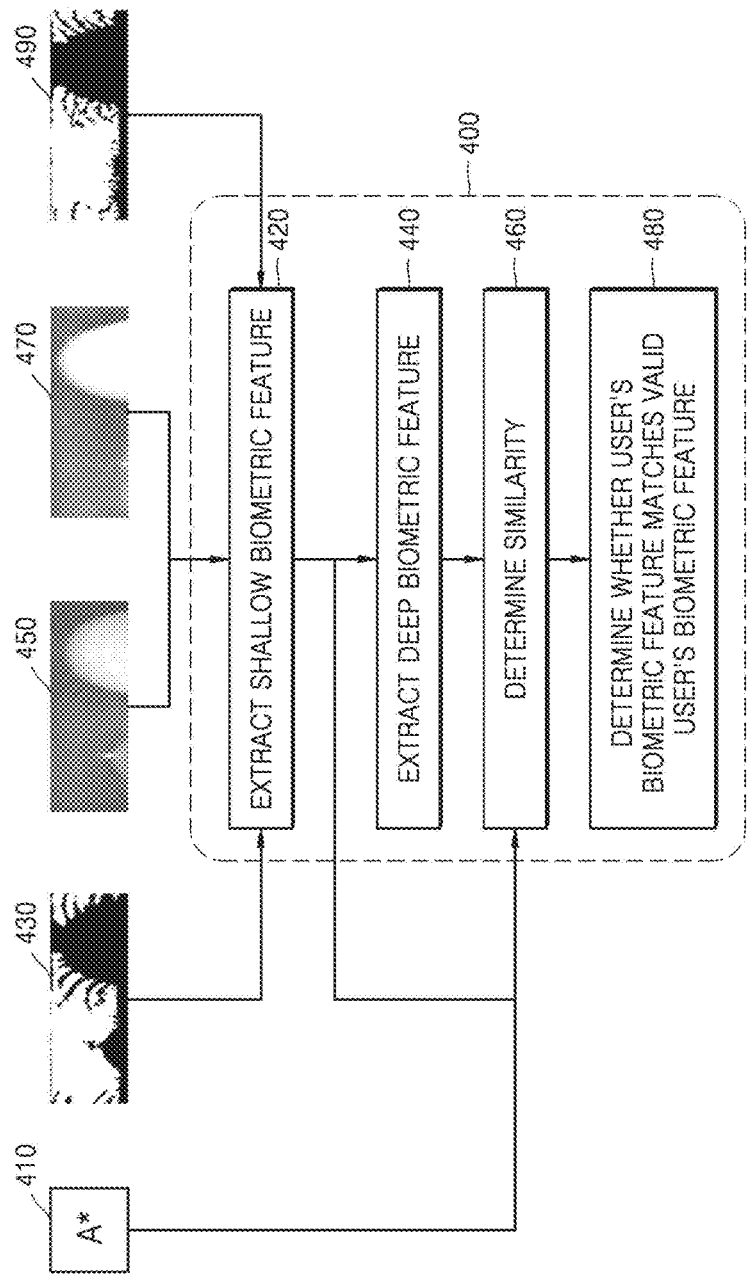
FIG. 4 is a diagram illustrating a method of performing a biometrics-based user authentication process by extracting a shallow biometric feature from a biometric image and extracting a deep biometric feature from the shallow biometric feature, according to an embodiment of the disclosure.

FIG. 4 is a diagram illustrating a method of performing a biometrics-based user authentication process by extracting a shallow biometric feature from a biometric image and extracting a deep biometric feature from the shallow biometric feature, according to an embodiment of the disclosure.

Referring to FIG. 4, a device may obtain a user's biometric image 450 and a valid user's biometric image 470. For example, in an iris-recognition-based user authentication system, the user's biometric image 450 may be an image of an iris with a dilated pupil, which is obtained in a dark environment, and the valid user's biometric image 470 may be an image of an iris with a contracted pupil, which is obtained in a bright environment. In addition, the device may obtain a first mask 430 and a second mask 490 that are results obtained by respectively normalizing the user's biometric image 450 and the valid user's biometric image 470 by using a learning network model.

In operation 420, the device may extract a shallow biometric feature from the user's biometric image 450, the first mask 430, the valid user's biometric image 470, and the second mask 490 by using a neural network. In an embodiment of the disclosure, a process of obtaining the first mask 430 and the second mask 490 may be skipped, and the device may extract the user's shallow biometric feature directly from the user's biometric image 450 in a dark environment and the valid user's biometric image 470 in a bright environment.

In operation 440, the device may extract a deep biometric feature from the extracted shallow biometric by using the neural network. That is, the shallow biometric feature may be extracted from an initial layer of a single neural network and the deep biometric feature may be extracted from a deep layer of the single neural network. According to an embodiment of the disclosure, the device may increase the accuracy of recognition by using the shallow biometric feature and the deep biometric feature. Alternatively, the device may extract the deep biometric feature from the shallow biometric feature, so that all procedures of a user authentication system may be performed by the single neural network, thereby simplifying a structure of a neural network compared to when two different neural networks are used. Based on a simplified network structure, the user authentication system may be operated in a mobile device having a limited computing resource.

In operation 460, the device may determine a similarity between the valid user's biometric feature and the user's biometric feature, based on the extracted shallow biometric feature and deep biometric feature. By using both the shallow biometric feature and the deep biometric feature, the device may maintain a high authentication speed of a biometrics-based user authentication process 400 and increase the accuracy of the biometrics-based user authentication process 400. In an embodiment of the disclosure, by using a single neural network, a user authentication system may be operated in a mobile device with a limited computing resource, based on a simplified network structure. In an embodiment of the disclosure, the similarity may be determined using additional information 410, as well as the extracted shallow biometric feature and deep biometric feature. For example, the additional information 410 may include, but is not limited to, situation information, including the weather and time when the user's biometric image 450 was obtained, a degree of lighting, etc., and the user's state information, including whether the user was wearing glasses or lenses, a degree of pupil dilatation or contraction, biometric feature information excluding biometric features of a part to be obtained, etc. The additional information 410 may be numerical representation information indicating degrees of distortion of values of pixels of the biometric image 450, based on the situation information and the user's state information when the biometric image 450 was obtained. For example, the additional information 410 may be represented by a vector and used by the device to determine a similarity, together with the shallow biometric feature and the deep biometric feature. In an embodiment of the disclosure, the device may perform a biometrics-based user authentication process with a more accurate recognition rate by taking into additional consideration the additional information 410.

In operation 480, the device may determine whether the user's biometric feature matches the valid user's biometric feature, based on the determined similarity. In an embodiment of the disclosure, when the similarity is greater than a threshold, the device may permit the user to access the device. In another embodiment of the disclosure, when the similarity is less than the threshold, the device may not permit the user to access the device. The threshold may be, but is not limited to, a predetermined value or an appropriate value determined according to a learning network model.

Figure 5:
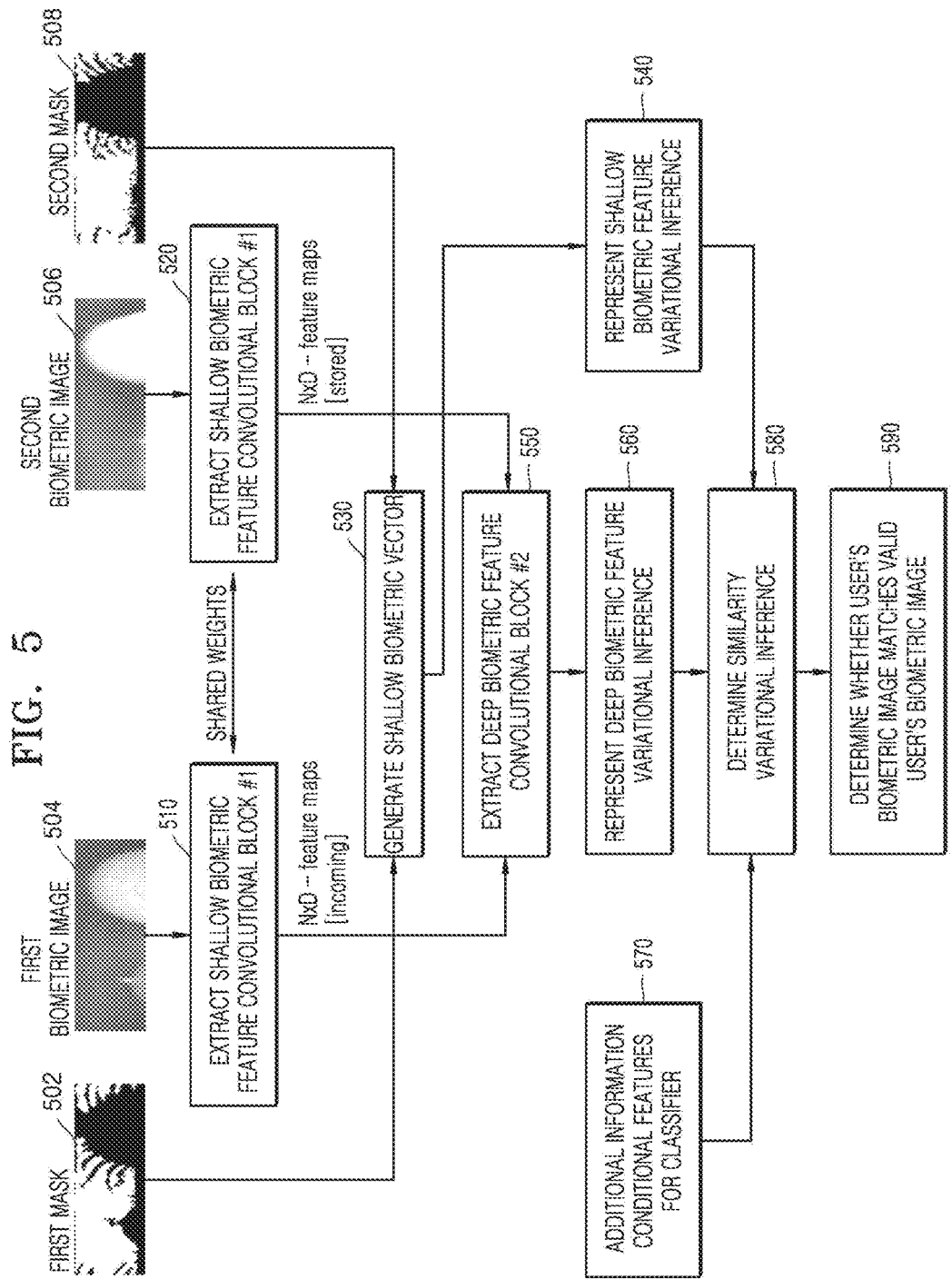
FIG. 5 is a block diagram of a biometrics-based user authentication method of performing a user authentication process considering a bio-mask, according to an embodiment of the disclosure.

FIG. 5 is a block diagram of a biometrics-based user authentication method of performing a user authentication process considering a bio-mask, according to an embodiment of the disclosure.

Referring to FIG. 5, a device may obtain a first biometric image 504 and a second biometric image 506. For example, the first biometric image 504 is a user's biometric image obtained in a dark environment, and the second biometric image 506 may be a valid user's biometric image obtained in a bright environment and stored in a memory. In an embodiment of the disclosure, the device may obtain a first mask 502 and a second mask 508 that are results of respectively processing the first biometric image 504 and the second biometric image 506 through a normalizing process, and store the second mask in the memory.

In operation 510, the device may extract a shallow biometric feature from the first biometric image 504 by using a first convolution block of a neural network. In operation 520, the device may extract a shallow biometric feature from the second biometric image 506 by using the first convolution block of the neural network. That is, the convolution block used to extract the shallow biometric feature from the first biometric image 504 and the convolution block used to extract the shallow biometric feature from the second biometric image 506 may be the same block. The shallow biometric features extracted from the first biometric image 504 and the second biometric image 506 may be used to extract a deep biometric feature by using a second convolution block of the neural network.

In operation 530, the device may generate a shallow biometric vector by using the first mask 502 and the second mask 508. In an embodiment of the disclosure, in operation 540, the shallow biometric vector may be used for the device to represent a shallow biometric feature through a variational inference.

In operation 550, the device may extract a deep biometric feature from the shallow biometric feature by using the second convolution block of the neural network. In operation 560, the deep biometric feature may be used for the device to represent a deep biometric feature through the variational inference.

In operation 580, the device may determine a similarity by using the shallow biometric feature and the deep biometric feature. In an embodiment of the disclosure, additional information 570 may be further considered for the device to the similarity. The additional information 570 may include, but is not limited to, situation information, including the weather and time when the user's biometric image was obtained, a degree of lighting, and the user's state information, including whether the user was wearing glasses or lenses, a degree of pupil dilatation or contraction, biometric feature information excluding biometric feature information of a part of a living body to be obtained. In an embodiment of the disclosure, the device may perform a biometrics-based user authentication process with a more accurate recognition rate by taking into additional consideration the additional information 570. For example, the device may determine a similarity between a dilating pupil included in the first biometric image 504 and a contracting pupil included in the second biometric image 506, based on the additional information 570 including information regarding the first biometric image 504 obtained in a dark environment and information regarding the second biometric image 506 obtained in a bright environment.

In operation 590, the device may determine whether the user's biometric image matches the valid user's biometric image, based on the determined similarity. In an embodiment of the disclosure, a normalizing process may be further used in the representation of the shallow biometric feature by the device in operation 540, the determination of the similarity by the device in operation 580, and the determination as to whether the user's biometric feature matches the valid user's biometric feature, performed by the device, in operation 590.

Figure 6:
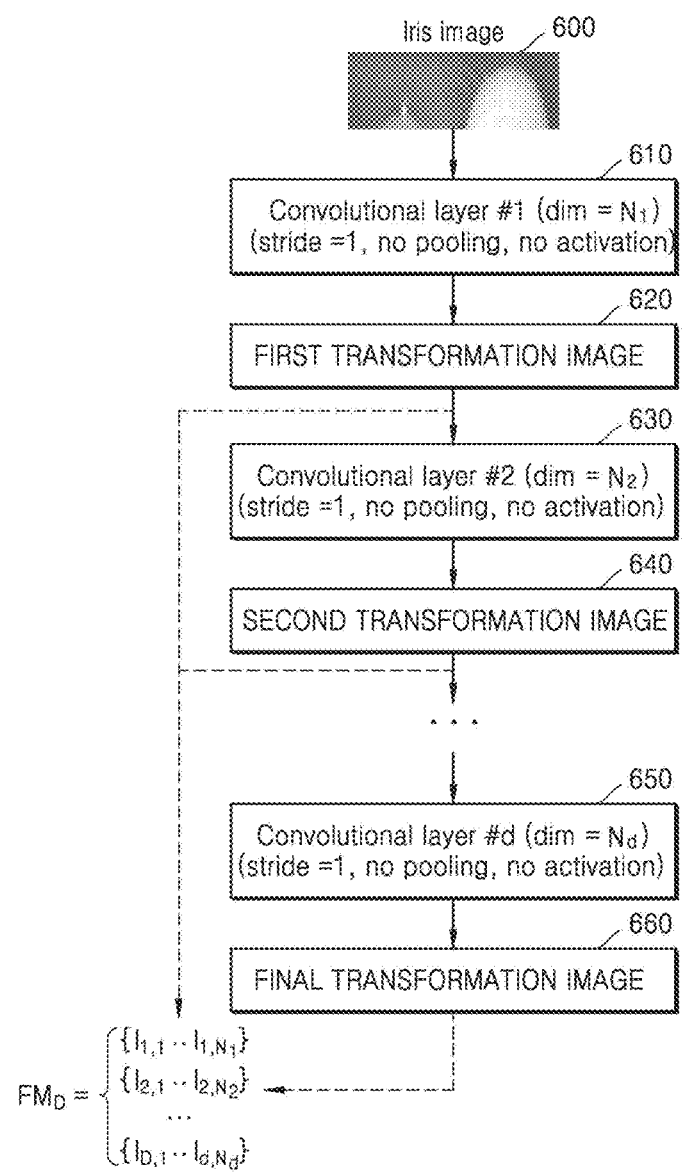
FIG. 6 is a diagram illustrating a method of processing a biometric image by using a neural network including one or more convolution layers, according to an embodiment of the disclosure.

FIG. 6 is a diagram illustrating a method of processing a biometric image by using a neural network including one or more convolution layers, according to an embodiment of the disclosure.

In an embodiment of the disclosure, the biometric image is described as an iris image 600 but is not limited thereto and may include an image of another part of the body, e.g., a fingerprint image, a facial image, a hand image, a retina image, an ear image, or a palm line image. In an embodiment of the disclosure, in a learning network model, a layer for performing a convolution operation and a layer for performing a transformation operation may be alternately included. In another embodiment of the disclosure, the learning network model may include a layer for performing both the transformation operation and the convolution operation. In another embodiment of the disclosure, the layer for performing the transformation operation may be configured after a layer for performing some convolution operations rather than a layer for performing all convolution operations. The layer for performing the transformation operation may be omitted, and a result of performing the convolution operation by one or more layers may be directly output.

In an embodiment of the disclosure, a first convolution layer 610 of the neural network may be a single convolution layer with a dimension of $N_1$ and a stride of 1. At the first convolution layer 610, an activation may not be performed, a dimension may not be reduced, and transformation may not be performed by another activity function. In an embodiment of the disclosure, the first convolution layer 610 may perform the convolution operation by using the iris image 600. A layer, for performing the transformation operation, subsequent to the first convolution layer 610 may generate a first transformation image 620 from a result of performing the convolution operation. However, in an embodiment of the disclosure, the transformation operation may be performed by the first convolution layer 610. Similarly, a second convolution layer 630 with a dimension of $N_2$ may perform the convolution operation by using the first transformation image 620. A layer, for performing the transformation operation, subsequent to the second convolution layer 620 may generate a second transformation image 640 from a result of performing the convolution operation. However, in an embodiment of the disclosure, the transformation operation may be performed by the second convolution layer 630. The device may generate a final transformation image 660 from the iris image 600 by using d convolution layers. A biometric feature map $FM_D$ may be generated using the first transformation image 620 to the final transformation image 660. The biometric feature map $FM_D$ may be expressed by:

$$FM_D = \begin{cases} \{I_{1,1}, I_{1,2}, ..., I_{1,N_1}\} \\ \{I_{2,1}, I_{2,2}, ..., I_{2,N_2}\} \\ ... \\ \{I_{d,1}, I_{d,2}, ..., I_{d,N_d}\} \end{cases}$$

$I_{d,i}$ is a component of $FM_D$.

Figure 7:
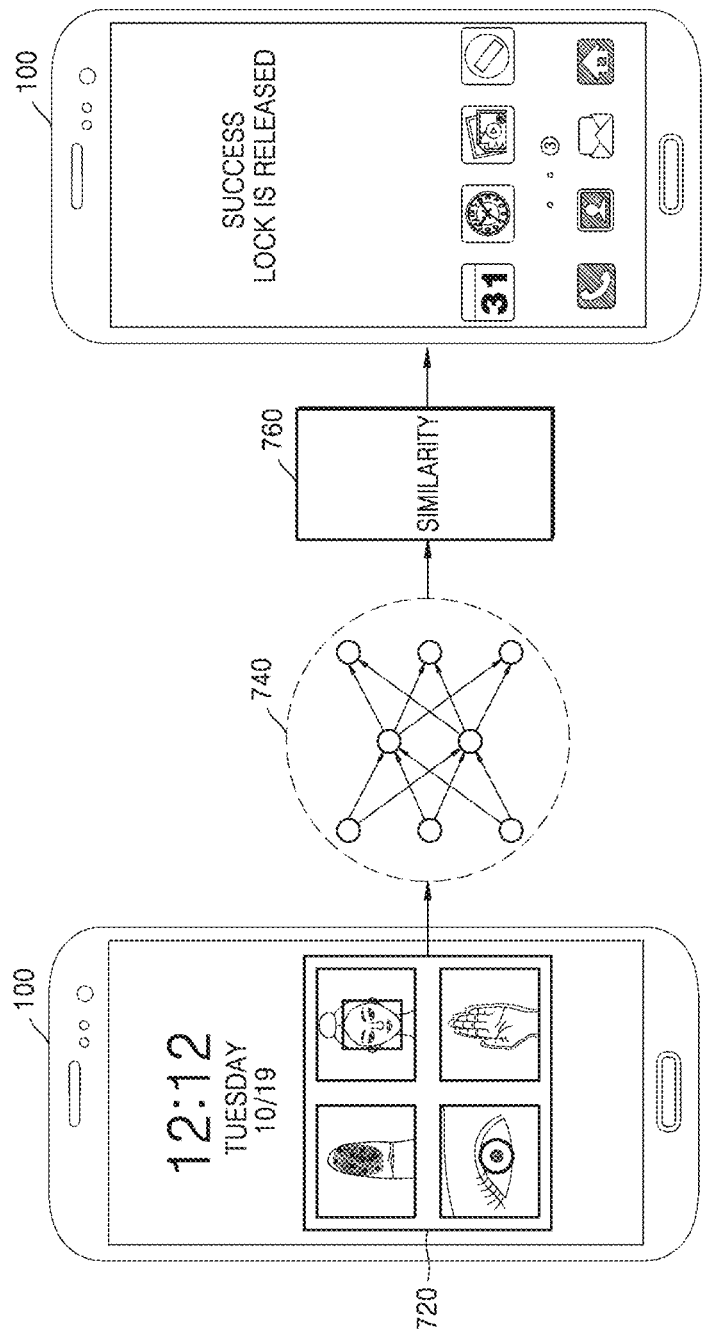
FIG. 7 is a diagram illustrating an overview of a biometrics-based user authentication method performed by a mobile device, according to an embodiment of the disclosure.

FIG. 7 is a diagram illustrating an overview of a biometrics-based user authentication method performed by a mobile device, according to an embodiment of the disclosure.

Referring to FIG. 7, a device 100 according to an embodiment of the disclosure may be a mobile device. In an embodiment of the disclosure, the device 100 may obtain a user's biometric image 720 by a camera, but embodiments are not limited thereto and the user's biometric image 720 may be obtained by a sensor, including a voice sensor, an image sensor, and the like, rather than a camera. Alternatively, the device 100 may obtain additional information regarding a point of time when the user's biometric image 720 was obtained. The device 100 may extract a shallow biometric feature from the obtained biometric image 720 by using a single neural network 740 of a learning network model, and extract a deep biometric feature from the shallow biometric feature. Alternatively, the device 100 may further consider the additional information during the extraction of the deep biometric feature and the shallow biometric feature. The device 100 may determine a similarity 760 with respect to a valid user's biometric feature by using the deep biometric feature and the shallow biometric feature extracted using the single neural network 740. In an embodiment of the disclosure, the device 100 may determine whether the user's biometric feature matches the valid user's biometric feature, based on the similarity 760.

In an embodiment of the disclosure, the device 100 may extract a shallow biometric feature from a shallow layer of the single neural network 740 and extract a deep biometric feature from a deep layer of the single neural network 740, and thus, all procedures of a user authentication system may be executed through the single neural network 740. Thus, the device 100 may simplify a structure of a neural network compared to when two different neural networks are used. Based on a simplified network structure, the user authentication system may be operated in a mobile device having a limited computing resource. Because the user's biometric features are extracted by the device 100, the user's privacy may be enhanced and the need for unnecessary connection with a network may be reduced.

Figure 8:
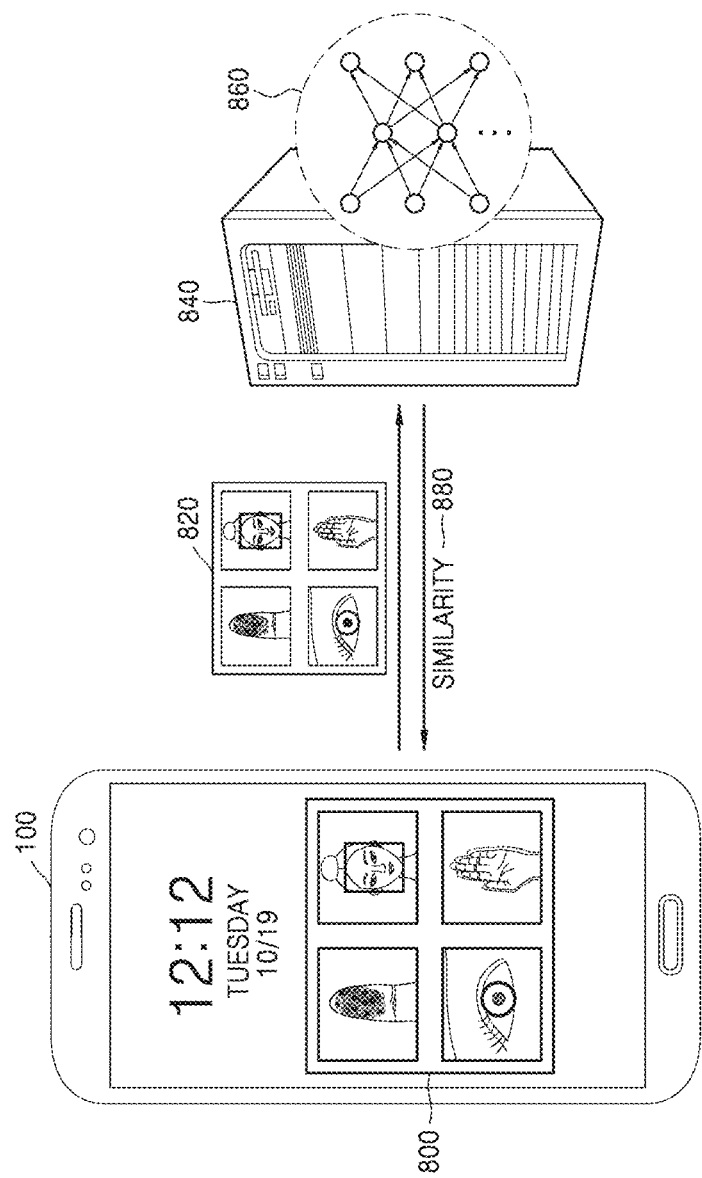
FIG. 8 is a diagram illustrating an overview of a biometrics-based user authentication method performed by a mobile device through a server, according to an embodiment of the disclosure.

FIG. 8 is a diagram illustrating an overview of a biometrics-based user authentication method performed by a mobile device through a server, according to an embodiment of the disclosure.

Referring to FIG. 8, the device 100 according to an embodiment of the disclosure may obtain a user's biometric image 800 by a camera, but embodiments are not limited thereto, and the user's biometric image 800 may be obtained by a sensor, including a voice sensor, an image sensor, and the like, rather than a camera. Alternatively, the device 100 may obtain additional information regarding a point in time when the user's biometric image 800 was obtained. The device 100 may transmit the user's biometric image 820 to a server 840. In addition, the device 100 may transmit additional information to the server 840. According to an embodiment of the disclosure, before the transmission of the user's biometric image 820 to the server 840, the device 100 may perform at least a part of the process of processing a biometric image described above with reference to FIG. 7 and transmit the biometric image 820 that is partially processed to the server 840. The server 840 may extract a deep biometric feature and a shallow biometric feature from the biometric image 820 by using a neural network 860. In addition, the server 840 may determine a similarity 880 between the user's biometric feature and a valid user's biometric feature by comparing the user's biometric feature with the valid user's biometric feature stored in a database. In an embodiment of the disclosure, the server 840 may transmit information regarding the determined similarity 880 to the device 100. The device 100 receiving the information regarding the similarity 880 may determine whether the user matches the valid user, based on the similarity 880, and allow the user to access the device 100 according to a result of the determination. According to an embodiment of the disclosure, the device 100 may extract biometric features from a biometric image by using the server 840 including the neural network 860, thereby quickly completing a user authentication process without causing delay due to load.

Figure 9:
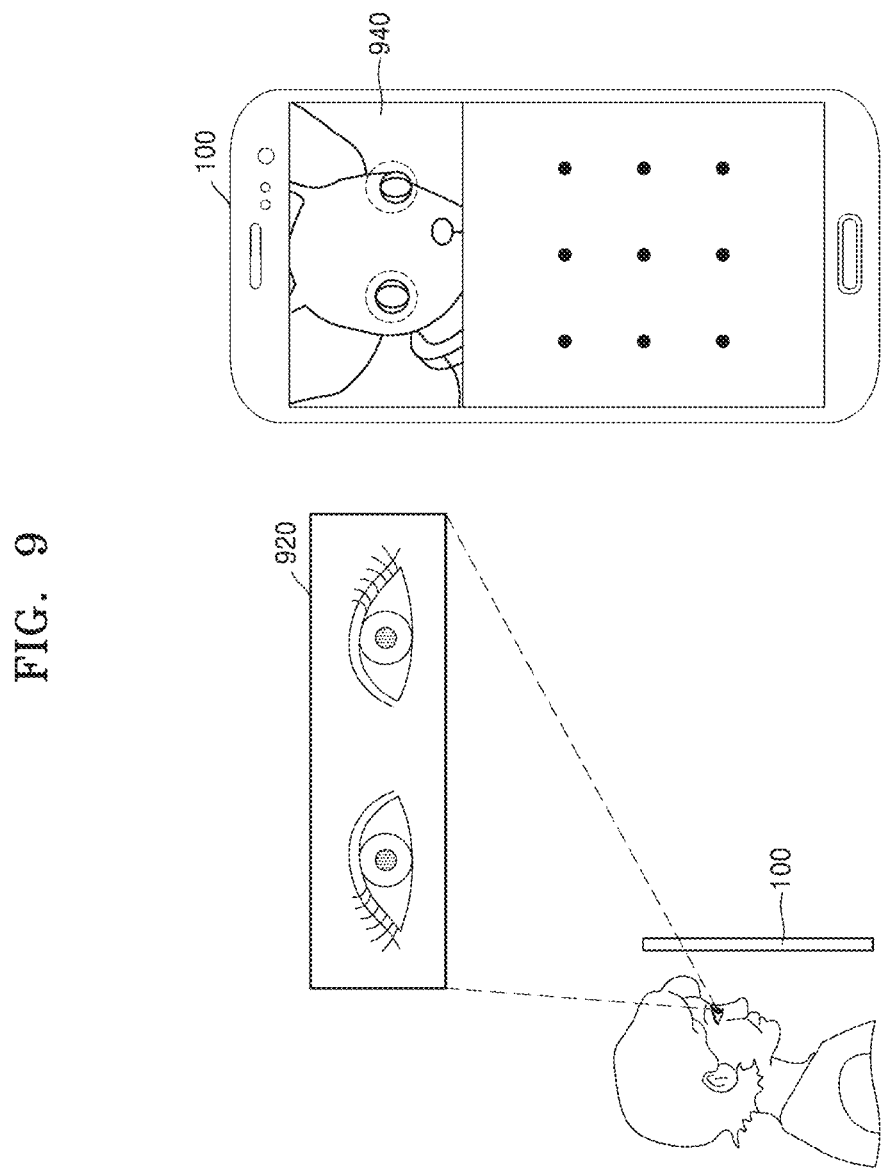
FIG. 9 is a diagram illustrating an overview of a method of recognizing a user's iris when the user's face is hidden, according to an embodiment of the disclosure.

FIG. 9 is a diagram illustrating an overview of a method of recognizing a user's iris when the user's face is hidden, according to an embodiment of the disclosure.

Referring to FIG. 9, a user may view a camera of a device 100 to cause the device 100 to identify his or her iris. The device 100 may obtain the user's iris image 920 through the camera. However, the device 100 may output an image 940 other than the user's face on a screen thereof. That is, the device 100 may display the user's iris image 920 entirely or while being partially hidden. For example, the device 100 may display the user's iris image 920 in the form of a mask, animal, or the like. Another image 940 may be an image set by the user or recommended by the device 100. In an embodiment of the disclosure, because the user's biometric image 920 is displayed entirely or while being partially hidden, the device 100 may reduce emotional discomfort that the user may feel when the user's face is displayed on the screen. In addition, the user may select a picture that he or she prefers as the other image 940. A manager of a biometrics-based user authentication security application may promote a user to use the biometrics-based user authentication security application by a method of making eye contact with a figure in a preferred picture or the like. For convenience of description, iris recognition has been described above but embodiments of the disclosure are not limited thereto and the method is applicable to all biometrics processes.

Figure 10:
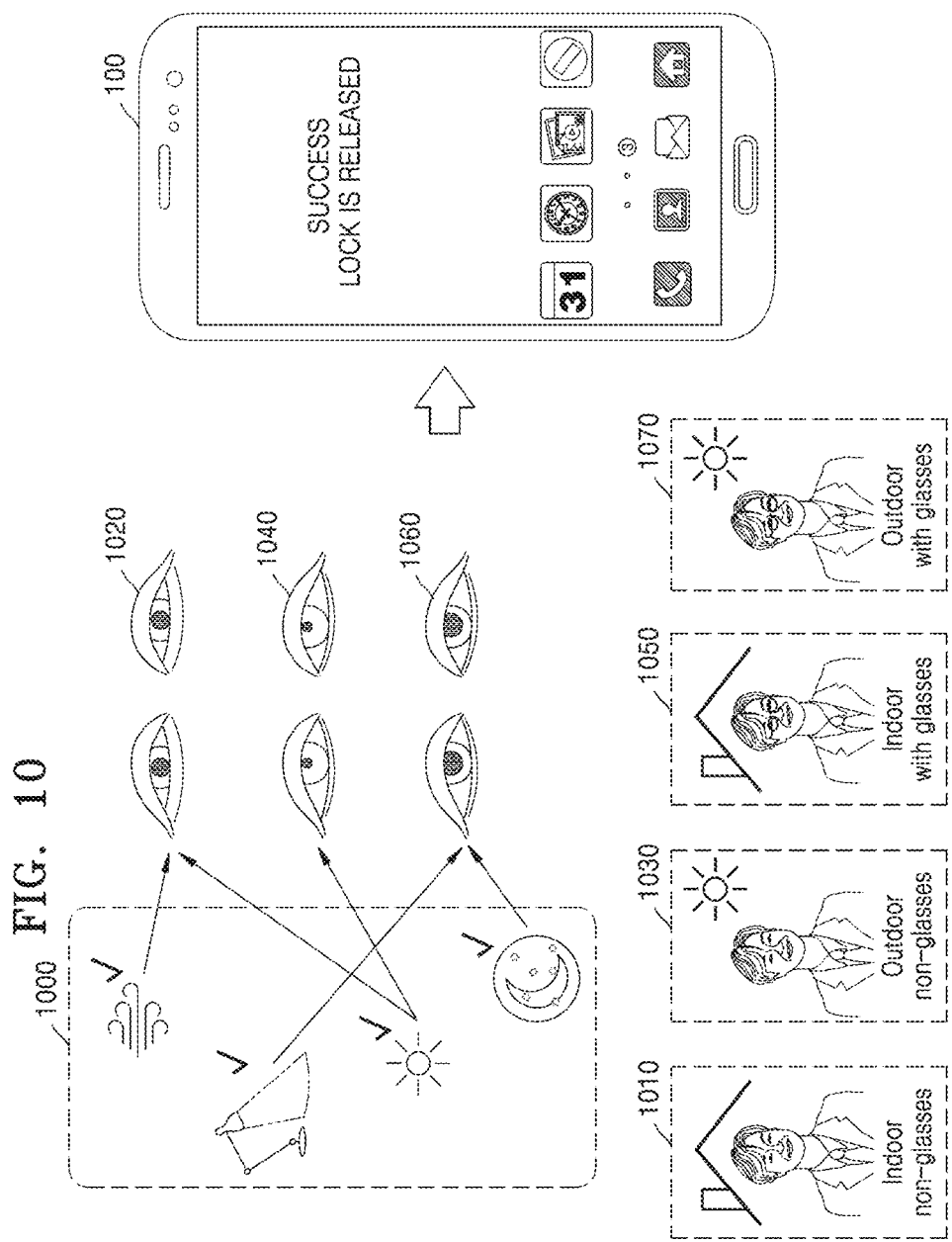
FIG. 10 is a diagram illustrating an overview of a method of performing a biometrics-based user authentication process by using additional information, according to an embodiment of the disclosure.

FIG. 10 is a diagram illustrating an overview of a method of performing a biometrics-based user authentication process by using additional information, according to an embodiment of the disclosure.

Referring to FIG. 10, a device 100 according to an embodiment of the disclosure may perform a biometrics-based user authentication process, based on additional information. In an embodiment of the disclosure, the additional information may include at least one of situation information 1000 or a user's state information at a point in time when the user's biometric image was obtained.

In an embodiment of the disclosure, the situation information 1000, when the user's iris image was obtained, may include, but is not limited to, the strength of the wind, the intensity of lighting, the intensity of sunshine, whether the time when the user's iris image was obtained is night or day, whether a place where the user's iris image was obtained is indoors or outdoors, etc. For example, when the wind is strong or the intensity of sunlight is strong, the user may open his or her eyes slightly to protect the eyes from the wind or sunlight. Accordingly, the device 100 may perform a user authentication process by obtaining an iris image in a state 1020 in which the user is opening his or her eyes slightly by taking into account an environment in which the wind or the intensity of sunshine is strong. In another example, a case in which an iris image was obtained during the day and a case in which an iris image was obtained at night may be considered. The device 100 may perform the user authentication process by taking into account a state 1040 in which a pupil contracts due to the intensity of light when the iris image was obtained during the day and a state 1060 in which a pupil dilates when the iris image was obtained at night.

In an embodiment of the disclosure, the user's state information may include, but is not limited to, a degree to which the iris is hidden by eyelashes and an eyelid, whether the user is wearing glasses or contact lenses, and the like. For example, when the user is wearing glasses, the device 100 may perform the user authentication process by taking into account whether the iris is hidden by the glasses frame, the reflection of light due to the lens of the glasses, and the like.

In an embodiment of the disclosure, the device 100 may take into account both the situation information 1000 and the user's state information at a point in time when the user's biometric image was obtained. For example, the device 100 may perform an iris-recognition-based user authentication process by taking into account a situation 1010 in which the user is not wearing glasses indoors, a situation 1030 in which the user is not wearing glasses outdoors, a situation 1050 in which the user is wearing glasses indoors, a situation 1070 in which the user is wearing glasses outdoors, or the like.

For convenience of description, the iris-recognition-based user authentication process has been described above but embodiments of the disclosure are not limited thereto and the above method is applicable to all biometrics-based user authentication processes.

Figure 11:
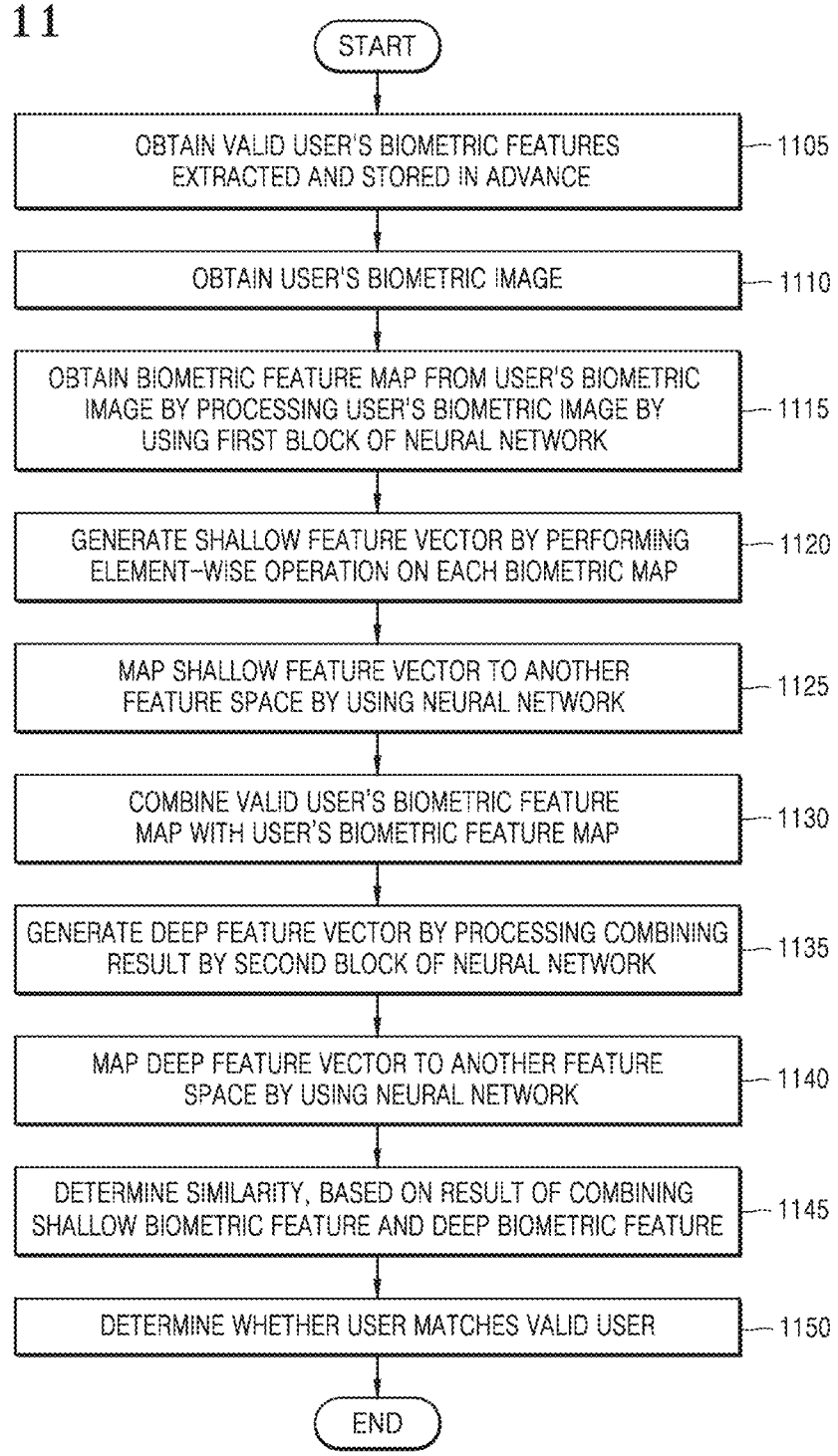
FIG. 11 is a flowchart of a biometrics-based user authentication method performed by a device, according to an embodiment of the disclosure.

FIG. 11 is a flowchart of a biometrics-based user authentication method performed by a device, according to an embodiment of the disclosure.

Referring to FIG. 11, in operation 1105, a device may obtain a valid user's biometric features extracted in advance and stored in a memory. The device may obtain a valid user's biometric image in advance. Alternatively, the device may obtain biometric features from a valid user's biometric image by a learning network model. In an embodiment of the disclosure, the biometric features may include both a shallow biometric feature and a deep biometric feature, only the shallow biometric feature, or only the deep biometric feature. The device may store the valid user's biometric features. When a user performs a biometrics-based user authentication, the device may use the stored valid user's biometric features.

In an embodiment of the disclosure, the device may obtain a biometric feature map $FM_D^{st.}$ extracted in advance and corresponding to the valid user's biometric features stored in the memory. The biometric feature map $FM_D^{st.}$ of the valid user may be extracted in advance during registration of the valid user in the device. The device may obtain the valid user's image, process the valid user's biometric image by using a learned convolutional neural network to generate the biometric feature map $FM_D^{st.}$, and store the valid user's biometric feature map $FM_D^{st.}$ in the memory of the device to register the valid user as a rightful user of the device. In an embodiment of the disclosure, a valid user registration process may be performed in an initial activation operation. The neural network generating the valid user's biometric feature map $FM_D^{st.}$ may be used in a user authentication process of determining whether the user of the device is a valid user.

In operation 1110, the device may obtain the user's biometric image. According to an embodiment of the disclosure, after completing the valid user registration process, the device may start a user authentication process to determine whether the user who is currently using the device is a valid user. The device may obtain a biometric image by using a camera or a sensor. Operation 1110 may correspond to operation 210 described above with reference to FIG. 2.

In operation 1115, the device may obtain the user's biometric feature map from the user's biometric image by processing the user's biometric image by using a first block of the neural network. In an embodiment of the disclosure, the first block of the neural network may be the same as the first block of the neural network used during the generation of the valid user's biometric feature map $FM_D^{st.}$. That is, the device may generate a current user's at least one biometric feature map $FM_D^{inc.}$ by processing the user's biometric image by using the first used during the valid user registration process.

In an embodiment of the disclosure, the processing of the user's biometric image by using the first block of the neural network may include: processing an image by n or less convolution layers of a neural network, which includes a pooling layer for reducing dimensions but does not include an activation layer or includes neither the activation layer nor the pooling layer, and is configured to have a stride of 1 or more; and performing a convolution operation obtained by an output passing through i or less transformation layers and n or less convolution layers. In an embodiment of the disclosure, the number n of convolution layers and the number i of transformation layers may be each 3 or less. Transformation may include, but is not limited to, transformation using a hyperbolic tangent function tanh(x), transformation using an activation function, transformation using a quantization function, and transformation $$X_T = \begin{cases} 1, \tanh(x) > 0 \\ 0, \text{otherwise} \end{cases}$$

using a binarization function. According to an embodiment of the disclosure, the configuration of the neural network as described above may guarantee lightness of the neural network with all possible advantageous effects.

In an embodiment of the disclosure, the first block of the neural network may include a single convolution layer with a stride of 1 but may not include the activation layer and the pooling layer. That is, the device may perform the convolution operation using the first block of the neural network, and may not perform deformation by the activation function and dimension reduction.

In another embodiment of the disclosure, the first block of the neural network may include a single convolution layer and an activation layer. By using the first block of the neural network, the device may perform the convolution operation by the single convolution layer and thereafter perform transformation by the actual layer. For example, the device may perform the convolution operation by the single convolution layer by using the first block of the neural network and thereafter perform binarization transformation on a result of performing the convolution operation according to $$X_T = \begin{cases} 1, \tanh(x) > 0 \\ 0, \text{otherwise} \end{cases}$$

using the hyperbolic tangent function tanh(x). That is, single deformation may be performed, wherein i=1. The activation function may be a function such as sigmoid(x), arctg(x), softsign(x), relu(x), elu(x), prelu(x), or sin(x) but is not limited thereto.

In another embodiment of the disclosure, the convolution operation by the single convolution layer may be performed after a transformation operation. According to an embodiment of the disclosure, the transformation operation may be performed by a convolution layer. For example, a first transformation operation may be performed by a first convolution layer. According to another embodiment of the disclosure, the transformation operation may be performed by a layer for performing the transformation operation. The layer for performing the transformation operation and a convolution layer may be alternately arranged to form a neural network. According to another embodiment of the disclosure, the transformation operation may be performed by a layer or layers, for performing the transformation operation, after some convolution layers other than all convolution layers. That is, transformation may be skipped, and a result of performing the convolution operation by one or more convolution layers may be directly output (i=0).

In an embodiment of the disclosure, it may not be essential to divide the neural network into a first block and a second block. For example, when the structures and parameters of the first block and the second block of the neural network are the same, the device may use the neural network without separating the neural network into the first and second blocks instead of using separate blocks.

In operation 1120, the device may generate a shallow feature vector by performing an element-wise operation on each biometric map by using the neural network. The device may generate a shallow feature vector $$FV_{sh.} = \begin{cases} \{x_{1.1}, ..., x_{1.N_1}\} \\ \{x_{2.1}, ..., x_{2.N_2}\} \\ ... \\ \{x_{d.1}, ..., x_{d.N_d}\} \end{cases}$$

by performing the element-wise operation on an element $I_{d,i}^{inc.}$ of the user's at least one biometric feature map $FM_D^{inc.}$ and an element $I_{d,i}^{st.}$ of a valid user's at least one biometric feature map $FM_D^{st.}$. According to an embodiment of the disclosure, the element-wise operation may be performed by Equation 1 below.

$$x_{d,i} = \Sigma |I_{d,i}^{inc.} - I_{d,i}^{st.}| \qquad \text{Equation 1}$$

$X_{d,i}$ is ab identifier representing the difference between $FM_D^{st.}$ and the user's biometric feature map $FM_D^{inc.}$.

In an embodiment of the disclosure, the element-wise operation may be L1-norm or L2-norm performed on the element $I_{d,i}^{inc.}$ of the user's at least one biometric feature map $FM_D^{inc.}$ and the element $I_{d,i}^{inc.}$ of the valid user's at least one biometric feature map $FM_D^{st.}$.

In operation 1125, the device according to an embodiment of the disclosure may map the shallow feature vector to an another feature space by using the neural network. To obtain the shallow feature vector $FV_{sh.}^{R}$, the device may map the shallow feature vector $FV_{sh.}$ to the different feature space by using one or more additional layers of the neural network. That is, the another feature space may refer to a space in which mapping is performed using one or more additional layers of the neural network, and the device obtain the shallow feature vector $FV_{sh.}^{R}$ as a result of mapping the shallow feature vector $FV_{sh.}$ the other feature space.

In operation 1130, the device may combine the valid user's biometric feature map $FM_D^{st.}$ and the user's biometric feature map $FM_D^{inc.}$ by using the neural network. In an embodiment of the disclosure, the device may combine the valid user's at least one biometric feature map $FM_D^{st.}$ and the user's at least one biometric feature map $FM_D^{inc.}$. In another embodiment of the disclosure, the device may obtain a result of combining the valid user's at least one biometric feature map $FM_D^{st.}$ and the user's at least one biometric feature map $FM_D^{inc.}$ through the element-wise operation. For example, the element-wise operation may be, but is not limited to, an operation performed on the difference between the sums or products of values of pairs corresponding to elements.

In operation 1135, the device may generate the deep feature vector $FV_{deep.}$ by processing the result of combining the valid user's at least one biometric feature map $FM_D^{st.}$ and the user's at least one biometric feature map by using a second block of the neural network. According to an embodiment of the disclosure, a configuration (e.g., the number of layers, the number of transformations, dimensions, etc.) and parameters of the second block of the neural network may correspond to the configuration and parameters of the first block of the neural network. The configurations and parameters of the first block and the second block may be the same or different according to those permitted in the network, and may be determined by a data processing speed and a desired degree of accuracy of reception.

According to an embodiment of the disclosure, the device may reduce the lightness of the configuration of the neural network by extracting a deep biometric feature from a shallow biometric feature. A single neural network may be divided into two main blocks to extract a shallow biometric feature and a deep biometric feature, thereby simplifying the configuration of the neural network. In addition, the device may increase the accuracy of a biometric process without using a deep neural network with a large number of parameters. Therefore, an existing deep neural network is considerably complicated to be used in a mobile device with limited computing resources and other resources, whereas a neural network according to an embodiment of the disclosure is lightweight and thus is available in the mobile device. That is, a neural network according to an embodiment of the disclosure may provide a solution to the problem of a biometrics-based user authentication process even under constraints (e.g., limited computing resources of the mobile device) that cannot be fixed by the existing neural network.

In operation 1140, the device may map the deep feature vector $FV_{deep.}$ to a feature space other than the feature space to which the shallow feature vector $FV_{sh.}$ is mapped, by using the neural network. To obtain a deep feature vector $FV_{deep.}^{R}$, the device may map the deep feature vector $FV_{deep.}$ to the other feature space by using one or more additional layers of the neural network. That is, the feature space other than the feature space to which the shallow feature vector $FV_{sh.}$ is mapped may refer to a space to which mapping is performed using one or more additional layers of the neural network, and the one or more additional layers of the neural network may be different from the layers used for the mapping of the shallow feature vector $FV_{sh.}$. The device may obtain a shallow feature vector $FV_{sh.}^{R}$ as a result of mapping the shallow feature vector $FV_{sh.}$ to the other feature space. According to an embodiment of the disclosure, a layer of the neural network used to map the deep feature vector $FV_{deep.}$ to the feature space may be a fully-connected layer. The layers of the neural network may be consecutively arranged and have parameters of one or more distributions.

In 1145, the device may determine a similarity between the valid user's biometric feature and the user's biometric feature, based on the result of combining the shallow biometric feature and the deep biometric feature. To obtain a similarity vector $FV_{sim}$, the device may combine the shallow feature vector $FV_{sh.}^{R}$ and the deep feature vector $FV_{deep.}^{R}$ by using the neural network. That is, the similarity vector $FV_{sim}$ may be a result of combining the shallow feature vector $FV_{sh.}^{R}$ and the deep feature vector $FV_{deep.}^{R}$. To obtain the similarity vector $FV_{sim}$, one or more additional layers of the neural network may be used. According to an embodiment of the disclosure, the similarity vector $FV_{sim}$ may be mapped to a one-dimensional (1D) space by one or more additional layers of the neural network. That is, as a result of mapping the similarity vector $FV_{sim}$ to the 1D space, the device may obtain a similarity.

According to an embodiment of the disclosure, in operations 1125, 1140 and 1145, a layer or layers of the neural network used for the mapping of the vectors $FV_{sh.}$, $FV_{deep.}$ and $FV_{sim}$ may be fully-connected layer or layers with the same dimension. In addition, the layers of the neural network used for the mapping of the vectors $FV_{sh.}$, $FV_{deep.}$ and $FV_{sim}$ may be consecutively arranged and have parameters of one or more distributions. In an embodiment of the disclosure, the number and $FV_{sim}$ may be determined by one or more distribution parameters, and a of layers of the neural network used for the mapping of the vectors dimension of the distributions may be determined by the number of elements of each layer. In addition, each of the distributions may be a standard normal distribution with an expected value and a parameter of dispersion but is not limited thereto. Each of the distributions may have different parameters. For example, the distributions may be a gamma distribution, a log-normal distribution, a Poisson Distribution, etc. but are not limited thereto.

In an embodiment of the disclosure, in operations 1125 and 1140, in order to obtain the shallow feature vector $FV_{sh.}^{R}$ and the deep feature vector $FV_{deep.}^{R}$, the feature spaces to which the shallow feature vector $FV_{sh.}$ and the deep feature vector $FV_{deep.}$ are mapped may be spaces with a dimension greater than or equal to that of the feature spaces from which the shallow feature vector $FV_{sh.}$ and the deep feature vector $FV_{deep.}$ are obtained. A feature space to which the similarity vector $FV_{sim}$ is mapped may be a 1D space. That is, the device may determine a similarity in the feature vector to which the similarity vector $FV_{sim}$ is mapped. Thus, the device may obtain a similarity by mapping the similarity vector $FV_{sim}$ to the feature space to which the similarity vector $FV_{sim}$ is mapped.

In an embodiment of the disclosure, the neural network used in operations 1125, 1140, and 1145 may be learned in advance through a variational inference. In the variational inference used to learn the neural network, a posterior distribution is approximated to a probability distribution, which is easy to handle, and random values may be obtained by sampling in the random distribution. In the variational inference, selection of values from a distribution defined by fully-connected layers generated during the learning of the neural network and having the same dimension may be represented. The elements of each layer may be parameters of distributions. In an embodiment of the disclosure, the number of parameters defining the distribution may be determined by the number of fully-connected layers, and the dimension of each distribution may be determined by the number of elements included in each layer. The selection of values from the distribution may be randomly performed during a direct-pass learning process. As a result, parameters of the distribution may be learned. In a test (or use) mode of a network, the selection of values from the distribution may be determined using a function, which is a distribution parameter. In an embodiment of the disclosure, the distribution may be a standard normal distribution with an expected value $\mu$ and a variance $\sigma^2$ as parameters, and the function may be $y=\mu$. A convolutional neural network may be trained using a set of training data, which is a set of pairs of comparisons. A comparison target may be the same living body or include two different living bodies. A configuration of the neural network (the number of parameters, the type and number of layers, and the like) may be selected considering requirements such as a data processing speed and a desired level of accuracy of recognition.

In operation 1150, the device may determine whether the user matches the valid user, based on the determined similarity. When the similarity is greater than a threshold, the device may permit the user to access the device. When the similarity is less than the threshold, the device may not permit the user to access the device. The threshold may be, but is not limited to, a predetermined value or an appropriate value determined according to a learning network model.

In an embodiment of the disclosure, the threshold for the comparison may be set after testing a test sample. A result of the testing may be used to configure a curved receiver operating characteristic (ROC) reflecting the relationship between a false non-match rate (FNMR) and a false match rate (FMR). In an embodiment of the disclosure, the threshold may be determined by a value maintained within a limit in which the FNMR and the FMR are permitted according to a predetermined accuracy requirement of recognition.

Figure 12:
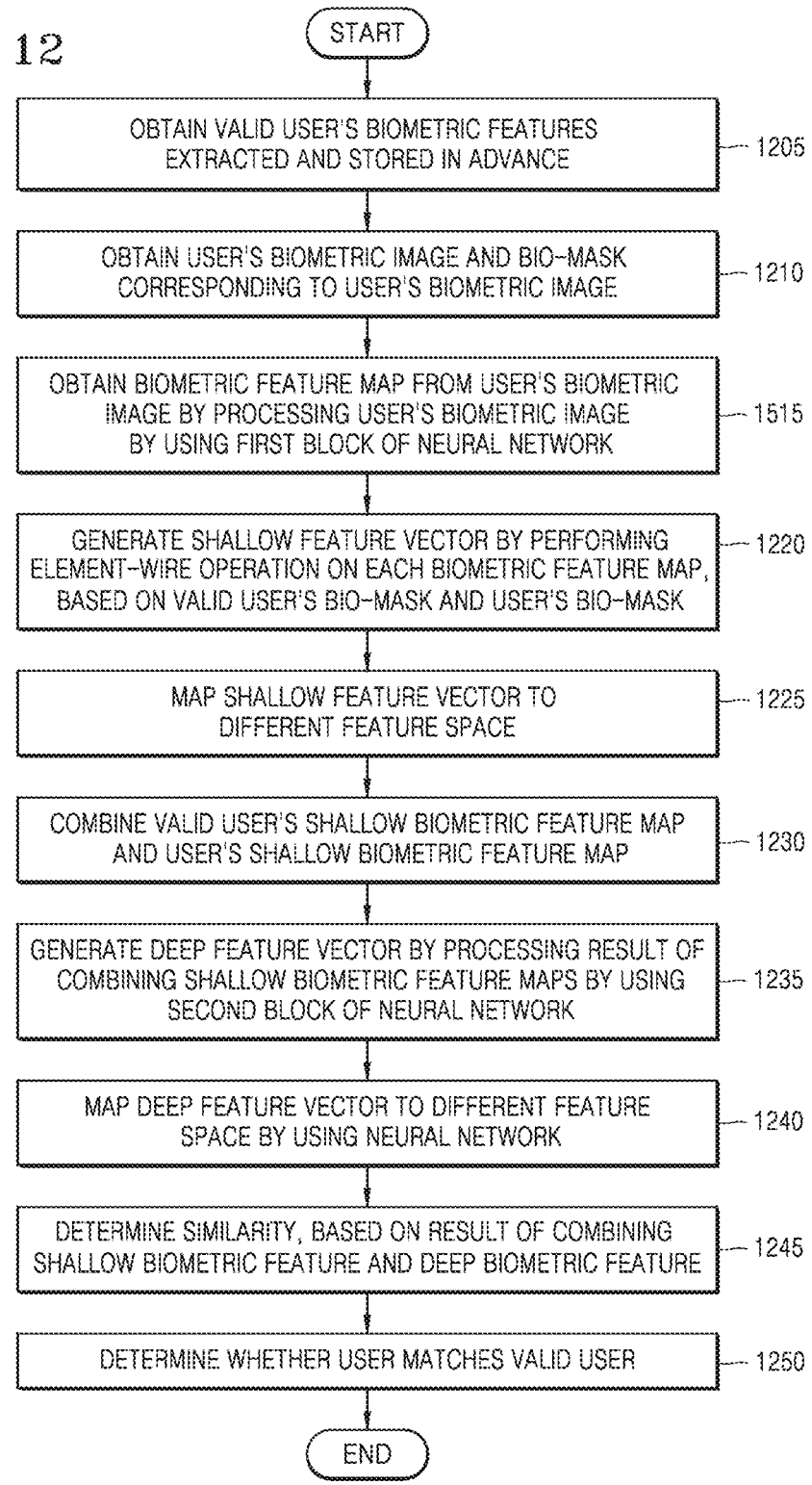
FIG. 12 is a flowchart of a biometrics-based user authentication method performed by a biometrics-based user authentication method device through a normalization process using a mask, according to an embodiment of the disclosure.

FIG. 12 is a flowchart of a biometrics-based user authentication method performed by a biometrics-based user authentication method device through a normalization process using a mask, according to an embodiment of the disclosure.

Referring to FIG. 12, in operation 1205, a device may be obtain a valid user's biometric features, which are extracted and stored in advance, and masks. In an embodiment of the disclosure, the mask may be a result of normalizing a biometric image. The normalizing of the biometric image may be defined as converting pixels of the biometric image from polar coordinates to linear coordinates. The pixels of the biometric image may be converted from a circular location to a rectangular matrix of the pixels by normalization. For example, the mask may display certain points on a normalized image of an iris hidden by, for example, an eyelids or eyelashes or due to dazzling. The device may obtain a valid user's biometric image in advance. In addition, biometric features and the valid user's mask $M_d^{st.}$ may be obtained from the valid user's biometric image by using a learning network model. In an embodiment of the disclosure, the biometric feature may include both a shallow biometric feature and a deep biometric feature, only the shallow biometric feature, or only the deep biometric feature. The device may store the obtained valid user's biometric features and mask $M_d^{st.}$. Thus, when a user performs a biometrics-based user authentication, the device may use the stored valid user's biometric features.

The device may obtain a biometric feature map $FM_D^{st.}$ corresponding to the valid user's biometric feature extracted in advance and stored in a memory. In an embodiment of the disclosure, the valid user's biometric feature map $FM_d^{st.}$ may be extracted in advance during registration of the valid user in the device. The device may obtain the valid user's biometric image, process the valid user's image by using the learned neural network to obtain the biometric feature map $FM_D^{st.}$ and the bio-mask $M_d^{st.}$ $M_d^{st.}$, and store the valid user's biometric feature map $FM_D^{st.}$ and the bio-mask $M_d^{st.}$ in a memory of the device to be used at a later time. In addition, the device may scale the valid user's bio-mask $M_d^{st.}$ to the size of the valid user's biometric feature map $FM_D^{st.}$ by using the neural network. In an embodiment of the disclosure, a valid user registration process may be performed in an initial activation operation. The neural network generating the valid user's biometric feature map $FM_D^{st.}$ and bio-mask $M_d^{st.}$ may be used in a user authentication process of determining whether the user of the device is a valid user.

In operation 1210, the device may obtain the user's biometric image and a bio-mask $M_d^{inc.}$ corresponding to the user's biometric image. In an embodiment of the disclosure, a first block of the neural network may be the same as the first block of the neural network used during the generation of the valid user's biometric feature map $FM_D^{st.}$. That is, the device may generate a current user's at least one biometric feature map $FM_D^{inc.}$ by processing the user's biometric image by using the first block used during the valid user registration process. The user's bio-mask $M_d^{inc.}$ may be a result of normalizing the user's biometric image.

In an embodiment of the disclosure, methods of the related art may be used as a method of obtaining the valid user's bio-mask $M_d^{st.}$ and the user's bio-mask $M_d^{inc.}$. According to an embodiment of the disclosure, the use of the mask may improve the accuracy of biometrics-based user authentication.

In operation 1215, the device may obtain a biometric feature map from the user's biometric image by processing the user's biometric image by using the first block of the neural network. According to an embodiment of the disclosure, operation 1215 may correspond to operation 1115 described above with reference to FIG. 11.

In operation 1220, the device may generate a shallow feature vector $FV_{sh.}$ by performing the element-wire operation on each biometric feature map, based on the valid user's bio-mask $M_d^{st.}$ and the user's bio-mask $M_d^{inc.}$. In an embodiment of the disclosure, the device may generate the shallow feature vector $$FV_{sh.} = \begin{cases} \{x_{1,1}, \ldots, x_{1,N_1}\} \\ \{x_{2,1}, \ldots, x_{2,N_2}\} \\ \ldots \\ \{x_{d,1}, \ldots, x_{d,N_d}\} \end{cases}$$

by performing the element-wise operation on an element $I_{d,i}^{inc.}$ of the user's at least one biometric feature map $FM_D^{inc.}$ and an element $I_{d,i}^{st.}$ of the valid user's at least one biometric feature map $FM_D^{st.}$. According to an embodiment of the disclosure, the element-wise operation may be performed by Equation 2 below.

$$x_{d,i} = \frac{\sum |I_{d,i}^{inc.} - I_{d,i}^{st.}| \times M_d}{\sum M_d} \qquad \text{Equation 2}$$

$$M_d = M_d^{inc.} \times M_d^{st.}$$

The difference between the valid user's biometric feature map $FM_D^{st.}$ and the user's biometric feature map $FM_D^{inc.}$ may be reflected through $x_{d,i}$. In an embodiment of the disclosure, the element-wise operation may be L1-norm or L2-norm performed on the element $I_{d,i}^{inc.}$ of the user's at least one biometric feature map $FM_D^{inc.}$ and the element $I_{d,i}^{st.}$ of the valid user's at least one biometric feature map $FM_D^{st.}$.

In operation 1225, the device may map the shallow feature vector to a different feature space by using the neural network. In operation 1230, the device may combine the valid user's shallow biometric feature map and the user's shallow biometric feature map by using the neural network. In operation 1235, the device may generate a deep feature vector by processing a result of combining the shallow biometric feature maps by using a second block of the neural network. In operation 1240, the device may map the deep feature vector to a different feature space by using the neural network. In operation 1245, the device may determine a similarity between the valid user's biometric feature and the user's biometric feature, based on the result of combining the shallow biometric feature and the deep biometric feature. According to an embodiment of the disclosure, operations 1225 to 1244 may correspond to operations 1125 to 1145 described above with reference to FIG. 11.

In an embodiment of the disclosure, the neural network used in operations 1225, 1240, and 1245 may be learned in advance through a variational inference. In the variational inference used to learn the neural network, a posterior distribution is approximated to a probability distribution, which is easy to handle, and random values may be obtained by sampling in the random distribution. In the variational inference, selection of values from a distribution defined by fully-connected layers generated during the learning of the neural network and having the same dimension may be represented. The elements of each layer may be parameters of distributions. In an embodiment of the disclosure, the number of parameters defining the distribution may be determined by the number of fully-connected layers, and the dimension of each distribution may be determined by the number of elements included in each layer. The selection of values from the distribution may be randomly performed during a direct-pass learning process. As a result, parameters of the distribution may be learned. In a test (or use) mode of a network, the selection of values from the distribution may be determined using a function, which is a distribution parameter. In an embodiment of the disclosure, the distribution may be a standard normal distribution with an expected value μ and a variance σ as parameters, and the function may be y=μ. According to an embodiment of the disclosure, a convolutional neural network may be trained using a set of training data, which is a set of pairs of comparisons. A comparison target may be the same living body or two different living bodies. A configuration of the neural network (the number of parameters, the type and number of layers, and the like) may be selected considering requirements such as a data processing speed and a desired level of accuracy of recognition.

In operation 1250, the device may determine whether the user matches the valid user, based on the determined similarity. According to an embodiment of the disclosure, operation 1250 may correspond to operation 1150 described above with reference to FIG. 11.

Figure 13:
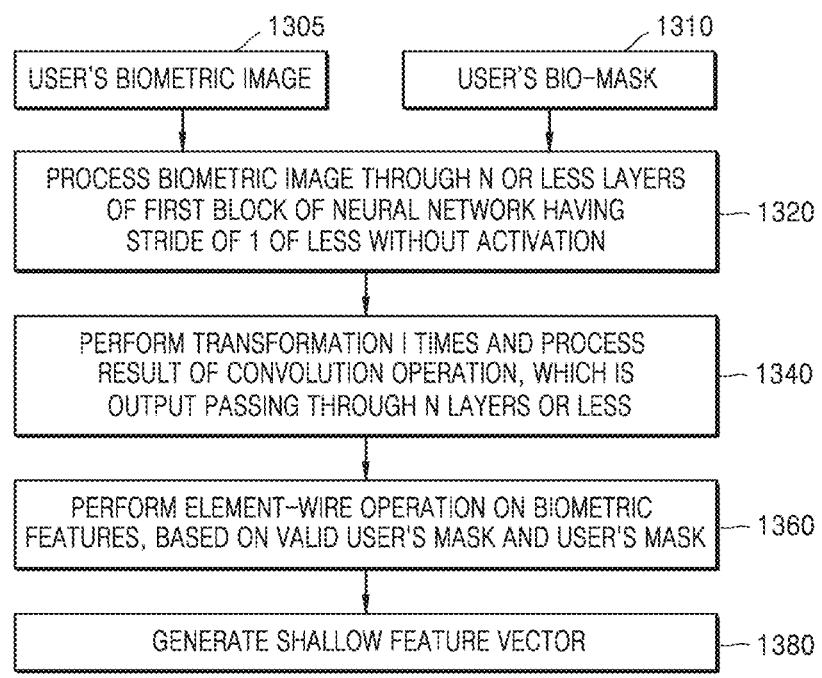
FIG. 13 is a flowchart illustrating schematically a method of extracting a shallow biometric feature from a user's biometric image, according to an embodiment of the disclosure.

FIG. 13 is a flowchart illustrating schematically a method of extracting a shallow biometric feature from a user's biometric image, according to an embodiment of the disclosure.

Referring to FIG. 13, in operations 1305 and 1310, a device may obtain a user's biometric image and mask. According to an embodiment of the disclosure, the device may obtain the biometric image by a camera or a sensor. The device may obtain the user's bio-mask $M_d^{inc.}$ by normalizing the biometric image by using a neural network.

In operation 1320, the device may process the biometric image by using the user's bio-mask by a first block of the neural network. The first block may be used to extract a biometric feature map $FM_D^{st.}$ in advance from a valid user's biometric image. According to an embodiment of the disclosure, a layer performing transformation by activation by the first block of the neural network may have a stride of 1 of less, including no layers for performing transformation by activation, and the number N of layers of the first block may be, for example, 3 or less.

In operation 1340, the neural network according to an embodiment of the disclosure may perform transformation a number i times and process a result of a convolution operation, which is an output passing through N layers or less. For example, the number i of times of transformation may be 3 or less. The transformation may include, but is not limited to, transformation using a hyperbolic tangent function tanh(x) and/or another activation function, transformation using a quantization function, transformation using a binarization function $$X_T = \begin{cases} 1, & \tanh(x) > 0 \\ 0, & \text{otherwise} \end{cases},$$

and the like. For example, the activation function may be sigmoid(x), arctg(x), softsign(x), relu(x), elu(x), prelu(x), or sin(x) but is not limited thereto.

In operation 1360, the device may perform the element-wire operation on biometric features by using the neural network, based on the valid user's mask and the user's mask. In operation 1380, the neural network may generate a shallow feature vector. In an embodiment of the disclosure, operations 1360 and 1380 may correspond to operation 1220 described above with reference to FIG. 12.

Figure 14:
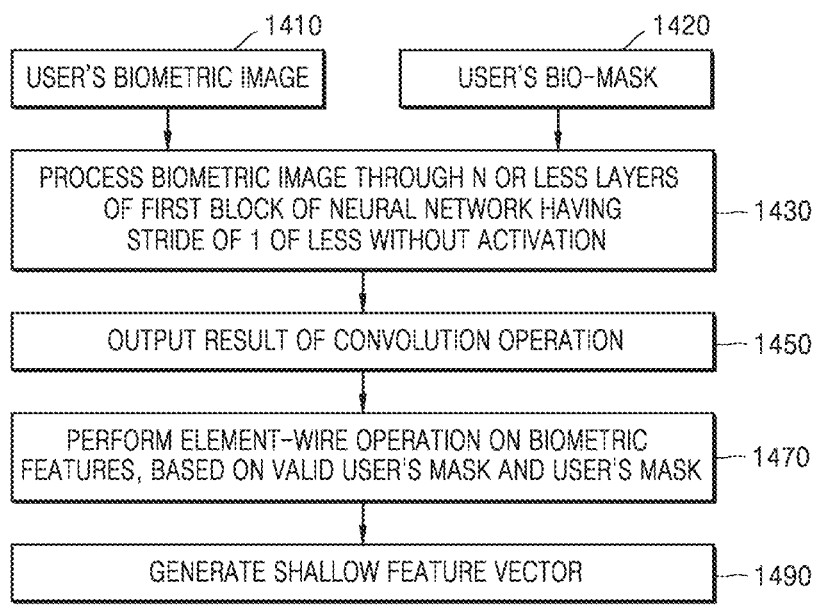
FIG. 14 is a flowchart illustrating schematically a method of extracting a shallow biometric feature from a user's biometric image, according to an embodiment of the disclosure.

FIG. 14 is a flowchart illustrating schematically a method of extracting a shallow biometric feature from a user's biometric image, according to an embodiment of the disclosure.

Referring to FIG. 14, in operations 1410 and 1420, a device may obtain a user's biometric image and mask by using a neural network. According to an embodiment of the disclosure, the device may obtain the biometric image by a camera or a sensor. The device may obtain the user's bio-mask $M_d^{inc.}$ by normalizing the biometric image by using a neural network.

In operation 1430, the device may process the biometric image by using the user's bio-mask by a first block of the neural network. The first block may be used to extract a biometric feature map $FM_D^{st.}$ in advance from a valid user's biometric image. According to an embodiment of the disclosure, a layer performing transformation by activation by the first block of the neural network may have a stride of 1 of less, including no layers for performing transformation by activation, and the number N of layers of the first block may be, for example, 3 or less.

In 1450, the neural network according to an embodiment of the disclosure may output a result of the convolution operation. That is, unlike in operation 1340 described above with reference to FIG. 13, transformation may be skipped and one or more results of the convolution operation may be directly output. That is, the number i of times of the transformation may be 0.

In operations 1470 and 1490, the device may generate a shallow feature vector $FV_{sh.}$ by performing the element-wire operation on each biometric feature map, based on the valid user's bio-mask $M_d^{st.}$ and the user's bio-mask $M_d^{inc.}$. In an embodiment of the disclosure, the device may generate the shallow feature vector $$FV_{sh.} = \begin{cases} \{x_{1,1}, ..., x_{1,N_1}\} \\ \{x_{2,1}, ..., x_{2,N_2}\} \\ ... \\ \{x_{d,1}, ..., x_{d,N_d}\} \end{cases}$$

by performing the element-wise operation on an element $I_{d,i}^{inc.}$ of the user's at least one biometric feature map $FM_D^{inc.}$ and an element $I_{d,i}^{st.}$ of the valid user's at least one biometric feature map $FM_D^{st.}$. In an embodiment of the disclosure, operations 1470 and 1490 may correspond to operation 1220 described above with reference to FIG. 12.

FIG. 15 is a flowchart of a biometrics-based user authentication method using additional information, according to an embodiment of the disclosure.

Referring to FIG. 15, in operation 1505, a device may be obtain a valid user's biometric feature extracted in advance and stored in a memory. According to an embodiment of the disclosure, operation 1505 may correspond to operation 1105 described above with reference to FIG. 11.

In operation 1510, the device may obtain a user's biometric image. In operation 1515, the device may obtain a biometric feature map from the user's biometric image by processing the user's biometric image by using a first block of a neural network. In operation 1520, the device may generate a shallow feature vector by performing the element-wire operation on each biometric feature map. In operation 1525, the device may map the shallow feature vector to a different feature space by using the neural network. In operation 1530, the device may combine the valid user's shallow feature map and the user's shallow feature map. In operation 1535, the device may generate a deep feature vector by processing a result of combining the shallow biometric feature maps by using a second block of the neural network. In operation 1540, the device may map the deep feature vector to a different feature space by using the neural network. According to an embodiment of the disclosure, operations 1505 to 1540 may correspond to operations 1105 to 1149 described above with reference to FIG. 11.

In operation 1545, the device according to an embodiment of the disclosure may determine a similarity, based on a result of combining the shallow feature vector, the deep feature vector, and additional information. To obtain a similarity vector $FV_{sim}$ using the neural network, the device may combine a shallow feature vector $FV_{sh.}^{R}$, a deep feature vector $FV_{deep.}^{R}$, and additional information. That is, the similarity vector $FV_{sim}$ may be a result of combining the shallow feature vector $FV_{sh.}^{R}$, the deep feature vector $FV_{deep.}^{R}$, and the additional information. In an embodiment of the disclosure, the additional information may include, but is not limited to, situation information, including the weather and time when the user's biometric image was obtained, a degree of lighting, etc., and the user's state information, including whether the user was wearing glasses or lenses, a degree of pupil dilatation or contraction, biometric feature information excluding biometric features of a part of a living body to be obtained. The additional information may be numerical representation information indicating degrees of distortion of values of pixels of the biometric image, based on the situation information and the user's state information when the biometric image was obtained. For example, the additional information may be represented by a vector and used by the device to determine a similarity, together with the shallow biometric feature and the deep biometric feature. In an embodiment of the disclosure, the device may perform a biometrics-based user authentication process with a more accurate recognition rate by taking into additional consideration the additional information.

According to an embodiment of the disclosure, one or more layers of a convolutional neural network may be used to obtain a similarity vector $FV_{sim}$. For example, the similarity vector $FV_{sim}$ may be mapped to a 1D space. That is, as a result of mapping the similarity vector $FV_{sim}$ to the 1D space, the device may obtain a similarity.

In operation 1550, the device may determine whether the user matches the valid user, based on the determined similarity. In an embodiment of the disclosure, when the similarity is greater than a threshold, the device may permit the user to access the device. When the similarity is less than the threshold, the device may not permit the user to access the device. In an embodiment of the disclosure, the threshold may be, but is not limited to, a predetermined value or an appropriate value determined according to a learning network model.

Figure 16A:
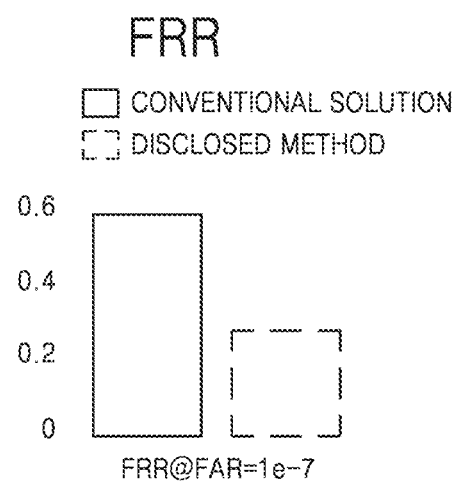
FIGS. 16A and 16B are diagrams illustrating experimental results according to an embodiment of the disclosure.
Figure 16B:
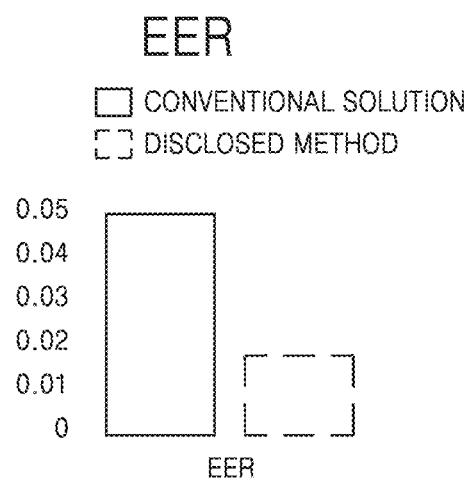

FIGS. 16A and 16B are diagrams illustrating experimental results according to an embodiment of the disclosure.

In an embodiment of the disclosure, the reliability of a recognition system may be evaluated by a false acceptable rate (FRR) error and a false rejection rate (FRR) error. An FAR is a false acceptance rate indicating a probability that a user will erroneously identify another person's biometric information as his or her biometric information, and when the FAR is 0.001%, it may mean that an error may occur once when authentication is performed a hundred thousand times. An FRR is a false rejection rate indicating a probability that a user will erroneously identify his or her biometric information as another person's biometric information, and when the FRR is 0.1%, it may mean that an error may occur once when authentication is performed a thousand times. An equal error rate (EER) may be understood as an error rate when the FAR and the FRR become equal to each other. The EER may be easily obtained from a receiver operating characteristic (ROC) curve. The EER is a quick way to compare the accuracy of a device with another ROC curve. Therefore, the accuracy of a device with a lowest EER may be highest. In an embodiment of the disclosure, the FAR and the FRR may be determined by comparing similarities calculated using a predetermined threshold and a neural network. The predetermined threshold may be determined from a result of simulation of a similarity between a valid user and a user. That is, as the difference in similarity between a similarity with the valid user and a similarity with an invalid user increases, the reliability of a recognition system may increase. Therefore, in an embodiment of the disclosure, in order to reduce a critical error occurring in the neural network according to an embodiment of the disclosure, biometric features are extracted in the form of a random variable from a biometric image and expressed in a distribution pattern, and a variational inference which is a regulation operation for reflecting all biometric features may be used.

Referring to FIGS. 16A and 16B, the performance of biometric recognition was checked in various directions under various indoor lightings and under the sun indoors. According to an embodiment of the disclosure an FRR was about 0.6 in the case of a biometrics-based user authentication method of the related art, whereas an FRR was about 0.2 in the case of a biometrics-based user authentication method according to an embodiment of the disclosure and the accuracy of recognition was improved about three times. An EER was about 0.045 in the case of the biometrics-based user authentication method of the related art, whereas an EER was about 0.015 in the case of a biometrics-based user authentication method according to an embodiment of the disclosure and the accuracy of recognition was improved about three times. In this regard, a valid user was tested 94569 times, a user who is an invalid user was tested 10104817 times, and the number of times of training, the number of times of verification, and the number of pieces of experimental data were respectively 32207, 4693, and 9034.

In the method of the related art, the performance of a biometric recognition system may be low when pupils excessively dilate or contract, when a user screws his or her eyes under strong lighting or in the sun, when a blurred image is obtained due to the tremor of a hand during obtaining of a biometric image, or the like. In a method of an embodiment of the disclosure, the neural network may be used as a tool for recording, processing and compensating for nonlinear distortion to extract unique biometric features of a biometric image from a low-quality image. In the method of an embodiment of the disclosure, a neural network for extracting biometric features from a biometric image may be used, and a second block of the neural network may be additionally used to improve the performance of biometrics in a less controlled environment. According to an embodiment of the disclosure, the second block of the neural network may not be deep. For example, the second block of the neural network may include five convolution layers or less. Accordingly, because the configuration of the neural network according to an embodiment of the disclosure may be lightweight, applications are applicable in a mobile device.

Figure 17:
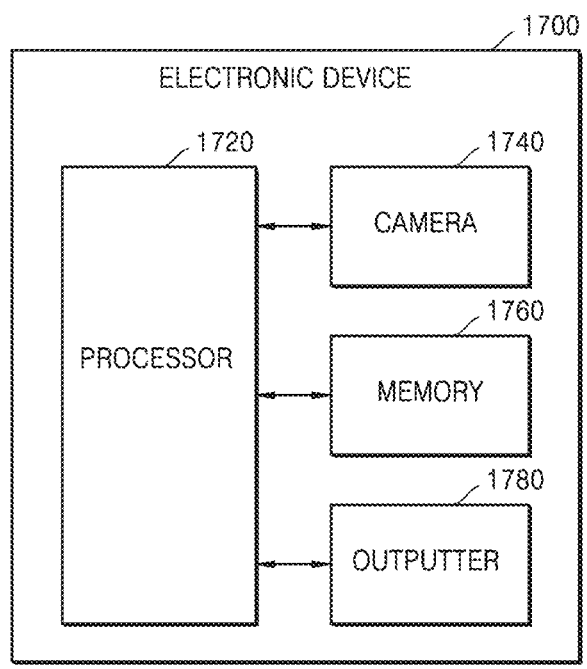
FIG. 17 is a schematic block diagram of a configuration of a biometrics-based user authentication device according to an embodiment of the disclosure.

FIG. 17 is a schematic block diagram of a configuration of a biometrics-based user authentication device according to an embodiment of the disclosure.

Referring to FIG. 17, the device 1700 may include a processor 1720, a camera 1740, a memory 1760, and an outputter 1780. However, all of the components illustrated in FIG. 17 are not dispensable components of the device 1700. The device 1700 may further include other components, as well as the components illustrated in FIG. 17, or may include only some of the components illustrated in FIG. 17.

The processor 1720 may control overall operations of the device 1700 and include at least one processor such as a CPU or a GPU. In an embodiment of the disclosure, the at least one processor may be embodied as an application-specific integrated circuit (ASIC), a field-programmable gate array (FPGA) or a system-on-chip (SoC). The processor 1720 may control the other components included in the device 1700 to perform an operation of the device 1700. For example, the processor 1720 may execute a program stored in the memory 1760, read a stored file from the memory 1760, or store a new file in the memory 1760. In an embodiment of the disclosure, the processor 1720 may execute a program stored in the memory 1760 to perform an operation of the device 1700. For example, the processor 1720 may obtain a user's biometric image, obtain a shallow biometric feature from the user's biometric image by using a first neutral network of a learning network model, obtain a deep biometric feature from the user's biometric image by using a second neutral network of the learning network model, determine a similarity between the shallow and deep biometric features and a valid user's biometric features stored in advance, and determine whether the user matches the valid user, based on the determined similarity.

The camera 1740 may include an internal camera, an external camera, a front camera, a camera with an infrared (IR) illumination, or a combination thereof. According to an embodiment of the disclosure, the camera 1740 may a biometric image. According to an embodiment of the disclosure, the biometric image may be a static biometric image or a plurality of biometric images. For example, the camera 1740 may obtain a biometric image sequence including a series of biometric images. According to an embodiment of the disclosure, the camera 1740 may obtain a video sequence.

Various types of data, e.g., programs such as an application, files, etc., may be installed and stored in the memory 1760. The processor 1720 may access and use the data stored in the memory 1760 or store new data in the memory 1760. In an embodiment of the disclosure, the memory 1760 may include a biometric feature database 190. In an embodiment of the disclosure, the memory 1760 may store biometric images captured by the camera 1740 of the device 1700, and biometric images and biometric features processed by the processor 1720.

The outputter 1780 may include a display, a sound outputter, and a vibration motor. According to an embodiment of the disclosure, the outputter 1780 may display a user's biometric image entirely or while being partially hidden.

Although not shown in FIG. 17, the device 1700 may further include a sensor unit (not shown). In an embodiment of the disclosure, the sensor unit may include an electroencephalography (EEG) sensor. The sensor unit may include, but is not limited to, at least one of a magnetic sensor, an acceleration sensor, a temperature/humidity sensor, an infrared sensor, a gyroscope sensor, a position sensor (e.g., a GPS), a barometer, a proximity sensor, or an RGB sensor (illuminance sensor).

Although not shown in FIG. 17, the device 1700 may further include a communicator (not shown). The communicator may include one or more components enabling the device 1700 to communicate with a server or an external device. For example, the communicator may include a short-range communicator, a mobile communicator, and a broadcast receiver. In an embodiment of the disclosure, the communicator may transmit the user's biometric image from the device 1700 to the server. In addition, the communicator may receive information regarding a similarity obtained by processing the user's biometric image by a server using a neural network.

Some embodiments of the disclosure may be embodied in the form of a recording medium, which stores instructions executable by a computer, such as a program module executed by a computer. A computer-readable medium may be any available storage medium accessible by a computer and may include a volatile storage medium, a non-volatile storage medium, a removable storage medium, and a non-removable storage medium. Alternatively, the computer-readable medium may include a computer storage medium. The computer storage medium includes all of a volatile medium, a non-volatile medium, a removable medium, and a non-removable medium implemented by a method or technology for storing information such as computer-readable instructions, data structures, program modules, or other data.

The embodiments of the disclosure set forth herein may be implemented as a software (S/W) program including instructions stored in a computer-readable storage medium.

The computer refers to a device capable of calling an instruction stored in a storage medium and operating according to the embodiments of the disclosure set forth herein, based on the called instruction, and may include an electronic device according to the embodiments of the disclosure set forth herein.

The computer-readable storage medium may be provided as a non-transitory storage medium. Here, the term "non-temporary" means that the storage medium does not include a signal and is tangible but does not indicate whether data is stored in the storage medium semi-permanently or temporarily.

Control methods according to the embodiments of the disclosure set forth herein may be provided by being included in a computer program product. A computer program product may be traded as a product between a seller and a purchaser.

The computer program product may include an S/W program and a computer-readable storage medium storing the S/W program. For example, the computer program product may include a product (e.g., a downloadable application) in the form of an S/W program distributed electronically by the manufacturer of a device or through an electronic market (e.g., Google Play Store or App Store). For electronic distribution of the computer program product, at least part of the S/W program may be stored in a storage medium or temporarily generated. In this case, the storage medium may be a storage medium of a server of the manufacturer, a server of the electronic market, or a storage medium of a relay server that temporarily stores the S/W program.

The computer program product may include a storage medium of a server or a storage medium of a device in a system that includes the server and the device. When there is a third device (e.g., a smartphone) communicatively connected to a server or a device, the computer program product may include a storage medium of the third device. Alternatively, the computer program product may include an S/W program transmitted from the server to the device or the third device or transmitted from the third device to the device.

In this case, the server, the UE, or the third device may execute the computer program product to perform the methods according to the embodiments of the disclosure set forth herein. Alternatively, two or more among the server, the device, and the third device may execute the computer program product to perform the methods according to the embodiments of the disclosure set forth herein in a distributed manner.

For example, the server (e.g., a cloud server or an artificial intelligence server) may execute a computer program product stored in the server to control the device communicatively connected thereto to perform the methods according to the embodiments of the disclosure set forth herein.

As another example, the third device may execute the computer program product to control the device communicatively connected thereto to perform the methods according to the embodiments of the disclosure set forth herein. When the third device executes the computer program product, the third device may download the computer program product from the server and execute the downloaded computer program product. Alternatively, the third device may execute the computer program product provided in a preloaded state to perform the methods according to the embodiments of the disclosure set forth herein.

The above description of the disclosure is intended to provide examples, and it will be understood by those of ordinary skill in the art that modifications may be made without departing from the technical idea or essential features of this disclosure. Therefore, it should be understood that the embodiments of the disclosure described above are merely examples in all respects and not restrictive. For example, components each described as a single type may be implemented in a distributed manner, and components described as being distributed may be implemented in a combined form.

The scope of the disclosure should be defined by the following claims other than the detailed description, and all changes or modifications derivable from the claims and their equivalents should be construed as being included in the scope of the disclosure.

The invention claimed is:

1. A biometrics-based user authentication method performed by a biometrics-based user authentication device, the biometrics-based user authentication method comprising:
obtaining, by the biometrics-based user authentication device, a biometric image of a user;
in response to obtaining the biometric image, obtaining, by the biometrics-based user authentication device, additional information including situation information and user state information, the situation information including at least one of weather and time information at a time at which the biometric image was obtained or information regarding a degree of lighting, the user state information including information regarding whether the user is wearing glasses or contact lenses;
generating, by the biometrics-based user authentication device, a first mask by normalizing the biometric image and a second mask by normalizing a valid user's biometric image;
based on the biometric image being obtained, obtaining, by the biometrics-based user authentication device, a shallow biometric feature from the biometric image, the valid user's biometric image, the first mask, and the second mask by using a first neural network;
obtaining, by the biometrics-based user authentication device, a deep biometric feature from the biometric image, the valid user's biometric image, the first mask, and the second mask by using a second neural network;
based on the additional information, the shallow biometric feature, and the deep biometric feature, determining, by the biometrics-based user authentication device, a similarity between biometric features of the user including the shallow and deep biometric features and valid user biometric features of a valid user stored in advance; and
based on the similarity, determining, by the biometrics-based user authentication device, whether the user matches the valid user,
wherein the first neural network and the second neural network are an artificial intelligence model including a plurality of layers, and the second neural network includes a different number of layers than the first neural network,
wherein the shallow biometric feature is an output of an output layer of the first neural network, and
wherein the shallow biometric feature is an input of an input layer of the second neural network.

2. The biometrics-based user authentication method of claim 1, wherein the obtaining of the deep biometric feature comprises obtaining the deep biometric feature from the shallow biometric feature by using the second neural network.

3. The biometrics-based user authentication method of claim 1, further comprising:
generating, by the biometrics-based user authentication device, a shallow feature vector by combining a valid user's shallow biometric feature with the shallow biometric feature obtained from the biometric image; and
generating, by the biometrics-based user authentication device, a deep feature vector by combining a valid user's deep biometric feature with the deep biometric feature obtained from the biometric image,
wherein the determining of the similarity comprises determining the similarity based on the shallow feature vector and the deep feature vector.

4. The biometrics-based user authentication method of claim 1, further comprising:
normalizing, by the biometrics-based user authentication device, the shallow and deep biometric features obtained from the biometric image,
wherein the determining of the similarity comprises determining the similarity by using the normalized shallow and deep biometric features.

5. The biometrics-based user authentication method of claim 1, wherein the artificial intelligence model comprises a learning network model learned in advance using a variational inference.

6. The biometrics-based user authentication method of claim 1, wherein the second neural network comprises five or less convolutional neural network layers.

7. The biometrics-based user authentication method of claim 1,
wherein a first number of layers included in the first neural network is different from a second number of layers included in the second neural network, and
wherein the second number of layers included in the second neural network is less than the first number of layers included in the first neural network.

8. The biometrics-based user authentication method of claim 1,
wherein the additional information further includes numerical representation information indicating degrees of distortion of values of pixels of the biometric image, and
wherein the distortion is generated based on the situation information and the user's state information at the time at which the biometric image was obtained.

9. The biometrics-based user authentication method of claim 1, further comprising:
based on the user state information indicating that the user is wearing glasses, determining whether an iris is hidden by at least one of a frame of the glasses or a reflection of light on a lens of the glasses; and
determine whether the user matches the valid user by taking into account whether the iris is hidden by at least one of the frame of the glasses or the reflection of light on the lens of the glasses.

10. A biometrics-based user authentication device comprising:
memory storing one or more computer programs; and
one or more processors communicatively coupled to the memory,
wherein the one or more computer programs include computer-executable instructions which, when executed by the one or more processors, cause the biometrics-based user authentication device to:
obtain a biometric image of a user,
in response to obtaining the biometric image, obtain additional information including situation information and user state information, the situation information including at least one of weather and time information at a time at which the biometric image was obtained, or information regarding a degree of lighting, the user state information including information regarding whether the user is wearing glasses or contact lenses,
generate a first mask by normalizing the biometric image and a second mask by normalizing a valid user's biometric image,
based on the biometric image being obtained, obtain a shallow biometric feature from the user's-biometric image, the valid user's biometric image, the first mask, and the second mask by using a first neural network,
obtain a deep biometric feature from the biometric image, the valid user's biometric image, the first mask, and the second mask by using a second neural network,
based on the additional information, the shallow biometric feature, and the deep biometric feature, determine a similarity between biometric features of the user including the shallow and deep biometric features and valid user biometric features of a valid user stored in advance, and
based on the similarity, determine whether the user matches the valid user,
wherein the first neural network and the second neural network are an artificial intelligence model including a plurality of layers, and the second neural network includes a different number of layers than the first neural network,
wherein the shallow biometric feature is an output of an output layer of the first neural network, and
wherein the shallow biometric feature is an input of an input layer of the second neural network.

11. The biometrics-based user authentication device of claim 10, wherein the one or more computer programs further include computer-executable instructions which, when executed by the one or more processors, cause the biometrics-based user authentication device to:
obtain the deep biometric feature from the shallow biometric feature by using the second neural network.

12. The biometrics-based user authentication device of claim 10, wherein the one or more computer programs further include computer-executable instructions which, when executed by the one or more processors, cause the biometrics-based user authentication device to:
generate a shallow feature vector by combining a valid user's shallow biometric feature with the shallow biometric feature obtained from the biometric image,
generate a deep feature vector by combining a valid user's deep biometric feature with the deep biometric feature obtained from the biometric image, and
determine the similarity based on the shallow feature vector and the deep feature vector.

13. The biometrics-based user authentication device of claim 10, wherein the one or more computer programs further include computer-executable instructions which, when executed by the one or more processors, cause the biometrics-based user authentication device to:
normalize the shallow and deep biometric features obtained from the biometric image, and
determine the similarity by using the normalized shallow and deep biometric features.

14. The biometrics-based user authentication device of claim 10, wherein the artificial intelligence model comprises a learning network model learned in advance using a variational inference.

15. The biometrics-based user authentication device of claim 10, wherein the second neural network comprises five or less convolutional neural network layers.

16. One or more non-transitory computer-readable storage media storing one or more computer programs including computer-executable instructions which, when executed by one or more processors of a biometrics-based user authentication device, cause the biometrics-based user authentication device to perform the biometrics-based user authentication method of claim 1.

* * * * *